United States Patent
Hollander

(10) Patent No.: US 8,050,657 B2
(45) Date of Patent: Nov. 1, 2011

(54) TAMPER RESISTANT CIRCUITRY AND PORTABLE ELECTRONIC DEVICES

(75) Inventor: James F. Hollander, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1152 days.

(21) Appl. No.: 11/691,879

(22) Filed: Mar. 27, 2007

(65) Prior Publication Data

US 2007/0266447 A1  Nov. 15, 2007

Related U.S. Application Data

(60) Provisional application No. 60/786,454, filed on Mar. 28, 2006.

(51) Int. Cl.
*H04B 1/40* (2006.01)
*H04M 1/66* (2006.01)

(52) U.S. Cl. ................... 455/411; 455/414.1

(58) Field of Classification Search ............ 455/226.1, 455/575.1, 90.1, 90.2, 90.3, 556.1, 410, 411, 455/414.1, 550.1
See application file for complete search history.

(56) References Cited

U.S. PATENT DOCUMENTS

| | | | |
|---|---|---|---|
| 4,293,737 A | 10/1981 | Cepelinski | |
| 4,491,691 A | 1/1985 | Embree et al. | |
| 4,641,124 A | 2/1987 | Davis | |
| 4,675,901 A | 6/1987 | Smith et al. | |
| 5,063,585 A | 11/1991 | Shapiro | |
| 5,117,457 A | 5/1992 | Comerford et al. | |
| 5,389,738 A | 2/1995 | Piosenka et al. | |
| 5,460,901 A | 10/1995 | Syrjala | |
| 5,604,797 A | 2/1997 | Adcock | |
| 5,844,884 A | 12/1998 | Szlenski | |
| 6,191,551 B1 | 2/2001 | Fischer et al. | |
| 6,208,114 B1 | 3/2001 | Jones et al. | |
| 6,249,109 B1 | 6/2001 | Kuiri | |
| 6,271,605 B1 | 8/2001 | Carkner et al. | |
| 6,351,099 B2 | 2/2002 | Jones et al. | |
| 6,380,711 B2 | 4/2002 | Fischer et al. | |
| 6,507,171 B2 | 1/2003 | Ruha et al. | |
| 6,856,922 B1 | 2/2005 | Austin et al. | |
| 6,912,399 B2* | 6/2005 | Zirul et al. | 455/463 |
| 6,917,680 B1 | 7/2005 | Korn et al. | |
| 7,015,891 B2 | 3/2006 | Lo | |
| 7,109,859 B2 | 9/2006 | Peeters | |
| 7,161,414 B2 | 1/2007 | Mizuno | |
| 7,590,405 B2* | 9/2009 | Ewell, Jr. | 455/404.1 |

(Continued)

OTHER PUBLICATIONS

"Five Chips from TI—Or, Is it Six?" M. Baron Mar. 17, 2003, Microprocessor Report.

(Continued)

*Primary Examiner* — Blane J Jackson
(74) *Attorney, Agent, or Firm* — Ronald O. Neerings; Wade James Brady, III; Frederick J. Telecky, Jr.

(57) ABSTRACT

A portable electronic device. Tamper-resistant circuitry for inclusion in an electronic device. The tamper-resistant circuitry comprises wireless receiving circuitry operable to receive an incoming communication. The tamper-resistant circuitry also comprises a first circuit operable to change a signal state in response to the incoming communication. The tamper-resistant circuitry also comprises a verification sensor circuit coupled to the first circuit. The sensor is operable to detect a circuit condition indicative of unauthorized use and upon detection of the circuit condition to prevent the change of the signal state.

42 Claims, 6 Drawing Sheets

U.S. PATENT DOCUMENTS

| | | | |
|---|---|---|---|
| 2003/0184474 A1* | 10/2003 | Bajikar | 342/450 |
| 2004/0114749 A1 | 6/2004 | Hayley et al. | |
| 2005/0029988 A1 | 2/2005 | Tran | |
| 2005/0046391 A1 | 3/2005 | Veselic et al. | |
| 2006/0117192 A1 | 6/2006 | Nokkonen | |
| 2007/0026906 A1* | 2/2007 | Macfarlane et al. | 455/575.1 |

OTHER PUBLICATIONS

"Debate over Disabling Cell Phones" AP/CBSNews.com, Dated Jul. 12, 2005, printed 2pp. Aug. 4, 2005.

"Nokia teams up in CDMA: Design Currents Tear Down"; D. Cary. EE Times May 9, 2005.

"Towards Automatic Device Configuration in Smart Environments" K. Connelly et al.; UbiSys '03 Oct. 12, 2003.

"Right Chip helps manage power" P. Heyer; EE Times Nov. 28, 2005; pp. 56, 68, 70.

"Remote Control via Mobil GSM Phone Kit" Apogee Schematic, (Undated, downloaded 3 pp. Jan. 10, 2006, 2nd page says last modified Dec. 11, 2005).

"IEEE Standard for Rechargeable Batteries for Cellular Telephones" IEEE Std 1725™-2006,; Apr. 18, 2006, pp. iv, 27-36, 50-51.

* cited by examiner

TAMPER RESISTANT CIRCUITRY AND PORTABLE ELECTRONIC DEVICES

CROSS-REFERENCES TO RELATED APPLICATIONS

This application claims priority to, the benefit of the filing date of, and hereby incorporates herein by reference, U.S. Provisional Patent Application 60/786,454, entitled "Tamper-Resistant Cell Phone Ringer Control Circuit, Ringer, Battery and Systems," and filed Mar. 28, 2006.

STATEMENT REGARDING FEDERALLY SPONSORED RESEARCH OR DEVELOPMENT

Not Applicable.

BACKGROUND OF THE INVENTION

The present embodiments relate to portable electronic devices and are more particularly directed to making electrical signals and other energy from circuits in such devices more tamper resistant to access.

Portable electronic devices have impacted if not revolutionized many aspects of contemporary lifestyle. One significant example of such a portable device is the cellular telephone. With its advent, improvement, and ubiquitous dissemination, the cellular telephone has changed how people and entities communicate in all manners of business and life. Numerous other portable electronic devices are also widely used and provide various benefits. Such devices include, but are not limited to: the personal digital assistant ("PDA") and related data organizers, any of which is sometimes referred to as a pocket computer or palmtop computer; portable alarm clocks and timers; portable music players capable of playing various audio and video formats, with such formats typically being one or more of various signal compression types (e.g., MP3, MPEG-4 AAC, AC-3, WMA, RealAudio, and still others); pagers; portable video game players; wireless email devices and other portable electronic devices. Further, some additional devices include the functionality of two or more of any of the preceding devices.

With increased use and prevalence also comes the unfortunate possibility that such portable electronic devices will be used for undesirable, unauthorized and nefarious purposes. Indeed, with the development of terrorism, so-called improvised explosive devices ("IED"; plural "IEDs") have been reportedly triggered by a portable electronic device. By placing a call to the cellular telephone, the terrorist might intend to exploit a change in signal activity therein due to the call event. As another example, a programmable function, such as a timed event for an alarm clock might be a subject of such exploitation. It would be desirable to provide improvements that would promote tamper-resistance to attempts to misuse portable electronic devices.

BRIEF SUMMARY OF THE INVENTION

In a form of the invention, tamper-resistant circuitry for inclusion in an electronic device comprises wireless receiving circuitry operable to receive an incoming communication. The tamper-resistant circuitry also comprises a first circuit operable to change a signal state in response to the incoming communication. The tamper-resistant circuitry also comprises a verification sensor circuit coupled to the first circuit. The verification sensor circuit is operable to detect a circuit condition indicative of unauthorized use and upon detection of the circuit condition to prevent the change of the signal state.

Numerous other forms of the invention are also disclosed and claimed.

DETAILED DESCRIPTION OF EMBODIMENTS

Figure 1:
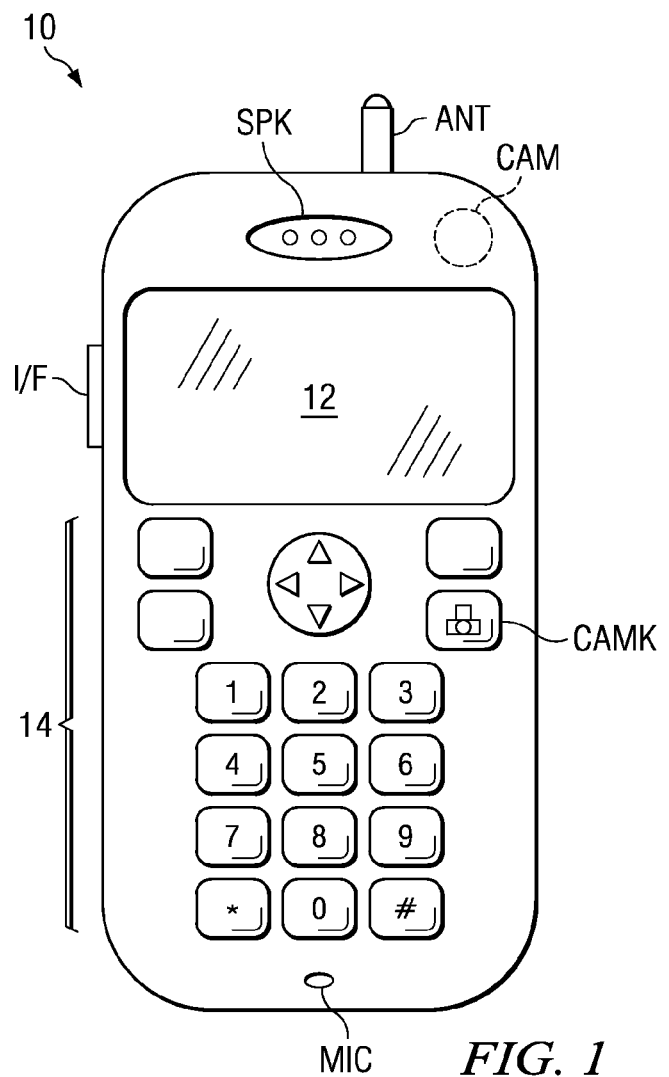
FIG. 1 illustrates a general diagram of a handset according to an embodiment.

In the example of FIG. 1, the housing of handset 10 is provided in any of various form factors and provides human interface features, including microphone MIC, speaker SPK, visual display 12 which may serve solely as an output or which also may include an input functionality such as through a touch screen or write pad functionality, and keypad 14. Keypad 14 includes alphanumeric and symbol keys for a wireless telephone handset. Soft keys adjacent display 12 suitably provide key functions. A directional key navigates a cursor or the like on display 12. A camera key CAMK actuates a camera function of handset 10, where the lens and image detecting device of camera CAM is on the reverse side of the handset housing. Camera CAM is used for still or video image capture, or both. Lastly, handset 10 includes one or more interfaces I/F that allow for coupling to numerous features of the handset, such as: (i) headphones/earphones; (ii) data transfer and processing; and (iii) charging the battery (not shown) of handset 10. Interface I/F is shown protruding from, but alternatively may be even with or recessed in, the housing of handset 10 in various devices.

Figure 2:
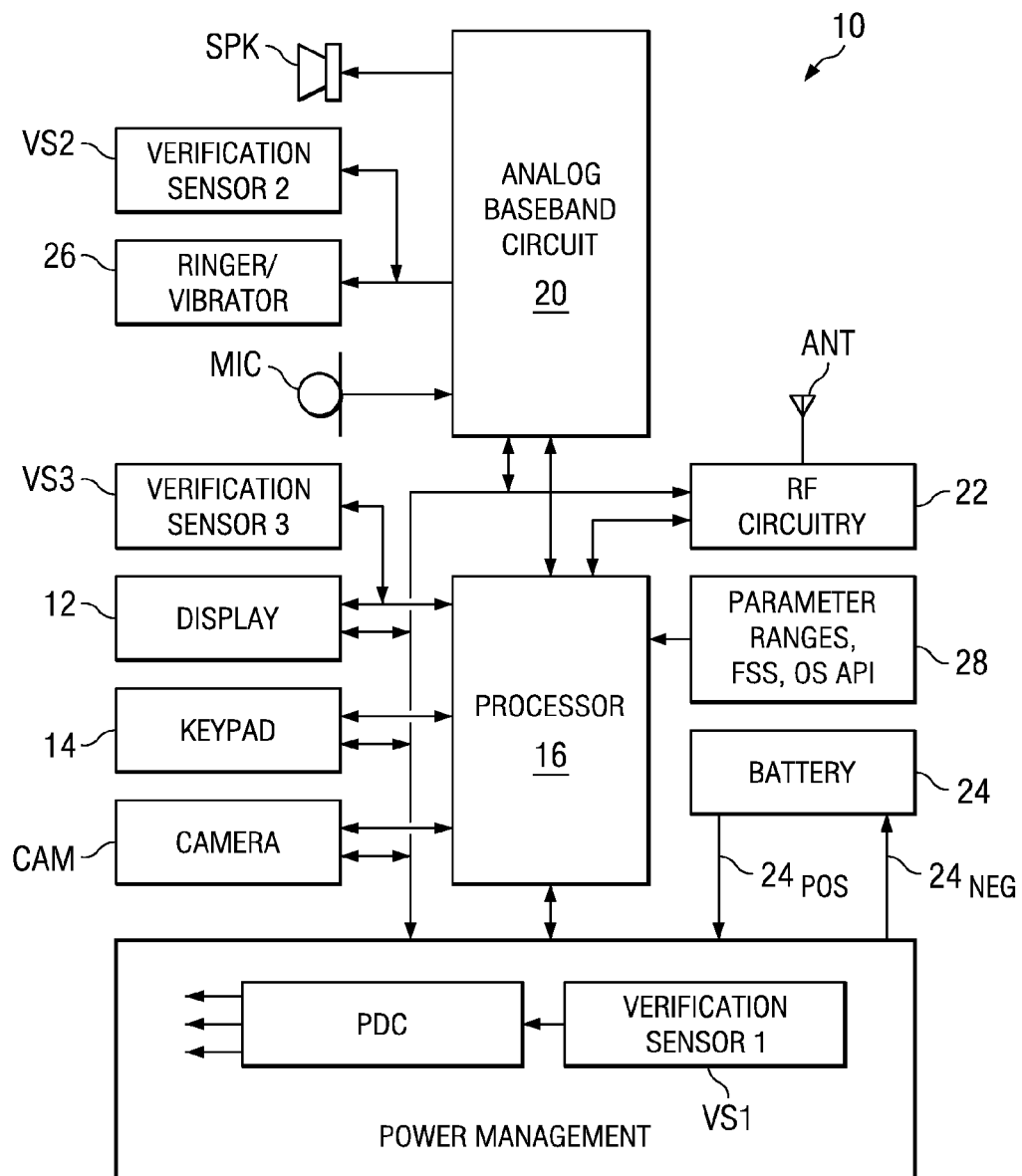
FIG. 2 illustrates an electrical functional block diagram of certain aspects of the handset of FIG. 1.

FIG. 2 illustrates the functional construction of an example architecture for handset 10. The particular architecture of a wireless handset (or other portable electronic device)

embodiment may vary from that illustrated in FIG. 2, to accomplish desirable authorized functions of the product and as such the architecture of FIG. 2 is presented only by way of example. As shown in FIG. 2, the operational functionality of handset 10 is generally controlled in part by a processor 16, which is coupled to visual display 12, keypad 14, camera CAM, a power management function 18, an analog baseband circuit 20, and radio frequency ("RF") circuitry 22. Each of these items is described below.

Processor 16 includes a core such as a reduced instruction set computer ("RISC") core and/or a digital signal processor ("DSP"). For simplicity these devices are not separately shown and in some embodiments are suitably included on a single integrated circuit as a combined processor such as a Texas Instruments Incorporated OMAP™ processor. Processor 16 includes a programmable logic circuit, such as a microprocessor or microcontroller, that controls the operation of handset 10 according to a computer program or sequence of executable operations stored in program memory. The program memory is on-chip with processor 16, and alternatively is implemented in read-only memory ("ROM") or other storage in a separate integrated circuit. The computational capability of processor 16 depends on the level of functionality required of handset 10, including the generation (2G, 2.5G, 3G, etc.) of wireless services for which handset 10 is to be capable. Internet web browsing, email handling, digital photography, game playing, PDA functionality, and the like are provided and controlled by processor 16. In addition, processor 16, and possibly through its separate DSP component if so included, performs the bulk of the digital signal processing for signals to be transmitted and signals received by handset 10. These functions include digital filtering, coding and decoding, digital modulation, and the like. Processor 16 and/or DSP, is operable to perform or assist with implementation of a tamper resistant methodology herein. Contemporary examples of DSPs suitable for use as a DSP in handset 10 according to this embodiment include the TMS320C5x family and TMS320C6x family of digital signal processors available from Texas Instruments Incorporated, and any other DSPs which can support portable electronic device functionality.

Power management function 18 is coupled to a power source, illustrated in FIG. 2 as a battery 24, wherein battery 24 is one of various types of rechargeable batteries and that typically includes a form factor and physical interface consistent with that of handset 10. For sake of illustration and later explanation, the connection of battery 24 to power management function 18 is shown by a separate positive $24_{POS}$ node and negative $24_{NEG}$ node, where by comparison other connections in FIG. 2 are more generally shown with a single line (unidirectional or bidirectional) that may include multiple conductors or provide bidirectional signals. In any event, at times when battery 24 provides sufficient power to power management function 18, then function 18 distributes regulated power supply voltages to various circuitry within handset 10 and manages functions related to charging and maintenance of battery 24, including standby and power-down modes to conserve battery power. Also in this regard, therefore, FIG. 2 illustrates connections between power management function 18 and many of the components in FIG. 2; these connections are shown by ways of example and are not intended to be exhaustive or limiting. According to some embodiments, power management function 18 further includes a verification sensor 1 VS1, labeled with a "1" to distinguish it from other such sensors that also may be included either centrally or distributed within the architecture of handset 10. Verification sensor 1 VS1 operates to evaluate one or more system parameters that can be measured via nodes $24_{POS}$ and $24_{NEG}$ to determine if the parameter(s) falls outside a range associated with normal operations. If this parameter-related condition (out-of-range) is met, then such embodiment concludes that tampering has occurred with respect to handset 10, and as a result verification sensor 1 VS1 either disables certain functionality of handset 10 so any signal(s) associated with such functionality are likewise disabled, or alternatively operates to maintain the status quo when a function is requested or called, that is, by not permitting the called function to occur so that there is no change in the signal states that relate to that function or otherwise that would occur if the called function were permitted to occur. As a result, if the tampering were done with an intent to use such a signal(s) or signal change in an undesirable act, for example such as to ultimately operate as a trigger unauthorizedly for the undesirable act, then by disabling or controlling the otherwise precipitating signal(s) the undesirable act is avoided.

Analog baseband circuit 20 processes the signals that are received from microphone MIC and communicates them in the digital domain to processor 16 for modulation and transmission. Circuit 20 also processes analog domain signals received from transmissions to handset 10 so that such signals may be output in audible form over speaker SPK after appropriate demodulation. Further, either or both microphone MIC and speaker SPK, and analog baseband circuit 20, may provide functions in addition to telephony, such as in connection with multimedia applications. Such functions may be used for notification, entertainment, gaming, data input/output, PDA functionality, and the like. Typical functions included within analog baseband circuitry 20 include analog-to-digital and digital-to-analog conversion, a voice coder/decoder ("CODEC"), as well as speaker amplifiers and other functions. Analog baseband circuit 20 is also coupled to a ringer/vibrator 26 that emits an audible sound via this ringer functionality or provides a vibration via a vibrator functionality, in response to one or more events. In some embodiments, ringer/vibrator 26 shares space with battery 24 in a detachable common unit providing a housing or encapsulation, and a ringer control circuit is located in the cell phone to which the common unit attaches. Ringer/vibrator 26 is controlled by a current-controlled or voltage-controlled ringer control circuit, e.g., within analog baseband circuit 20, that operates ringer/vibrator 26 using energy from battery 24. Such ringing/vibrating functionality responds to a telephone call received by and external from handset 10. Other events may call into operation ringer/vibrator 26, such as receipt of data or a timed event such as an alarm clock or calendar entry. The choice of ringer, vibrator, or both as well as the triggering events therefore are user selectable. Moreover, while shown separately in FIG. 2, note that the ringing function may be included with speaker SPK and the vibrator function may be included with, or formed together with, battery 24.

RF circuitry 22 is coupled to antenna ANT and to processor 16. RF circuitry 22 is also coupled to analog baseband circuit 20. RF circuitry 22 includes suitable functions to transmit and receive the RF signals, from and to handset 10, at the specified frequencies and with respect to a wireless telephone communications network.

In the embodiment of FIG. 2, handset 10 also includes verification sensors VS1, VS2 and VS3. As with verification sensor 1 VS1, each of verification sensors 2 VS2 and 3 VS3 operates to evaluate one or more system parameters that may be measured based on the connectivity of the respective sensor and detect voltages, currents, impedances and changes in any of them. Thus, verification sensor 2 VS2 is coupled to a node for driving and/or loaded by ringer/vibrator 26 so as to evaluate a parameter(s) associated therewith, and verification sensor 3 VS3 is coupled to a node for driving and/or loaded by display 12 so as to evaluate a parameter(s) associated therewith. Further, each such sensor, if detecting an out-of-range parameter(s), is operable to control associated functionality of handset 10 so that any signal(s) associated with such functionality are disabled or otherwise controlled so that the associated functionality is prevented from occurring, again in an effort to prevent the signals for such functionality from otherwise being used in a manner that is not intended by the manufacturer of handset 10. One skilled in the art will appreciate from the teachings of this document that any one or more of the verification sensors VS1, VS2, or VS3 are used singly or in combination with the others, and still other such sensors can be included in a distributed fashion or in a single location. The verification sensor(s) is directed to making access to electrical signals from handset 10 more tamper resistant.

An unauthorized circuit is an anticipated unauthorized and/or nefarious inclusion of series or parallel-connected circuitry by someone seeking to use handset 10 in an undesirable fashion. An unauthorized circuit is not miniaturized and optimized like circuitry of a mass-produced cell phone or other mass-produced portable electronic device product, and thus an unauthorized circuit is detectable by verification sensors and processes herein. The unauthorized circuit is likely to have wires and other circuitry or the like extending externally from the housing of handset 10. An unauthorized circuit would likely be added after handset 10 has been shipped by its manufacturer. Tamper-resistant circuitry herein, by contrast, is provided during manufacture or otherwise by authorized processes, into the mass-produced product and prevents activation of the ringing or vibrating function, or display function, or other function of a device product unit that has incorrect measured parameters compared to those expected of the authorized unmodified device product unit. When such an incorrect measured parameter(s) is found, the tamper-resistant circuitry protects the portable electronic device from exploitation that might otherwise be achieved by remotely communicating data that could be voice or sound data as in a telephone call, text data (e.g., text message, e-mail) or control data (e.g., beeper communication) to handset 10, or by programming into handset 10 a timer, timed, or calendar event for an alarm signal or the like.

Figure 3A:
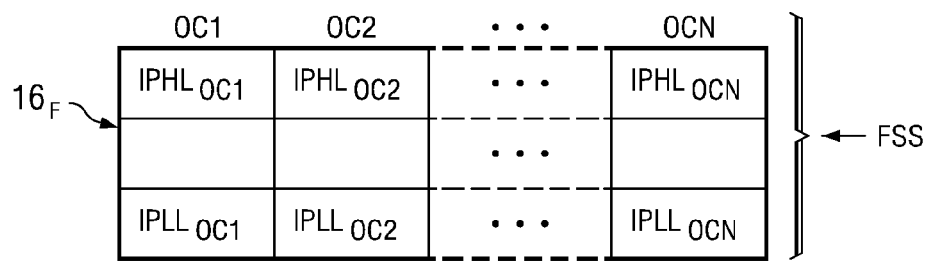
FIG. 3a illustrates a logical depiction of a fingerprint table in a stored medium and with initial high and low parameters stored therein.

FIG. 3a illustrates a data table $16_F$ referred to herein as a fingerprint table $16_F$. Fingerprint table $16_F$ is stored in any storage media accessible by handset 10, and by way of example the reference numeral 16 is used to associate fingerprint table $16_F$ with processor 16. For example, fingerprint table $16_F$ is suitably situated or generated within memory that is internal to processor 16 and protected from tampering. Further, as detailed later, certain of the values in fingerprint table $16_F$ are suitably also stored elsewhere in handset 10 such as in a non-volatile (e.g. flash) memory, and those values when used remain in that memory and/or are copied into internal memory of processor 16. Software referred to herein as fingerprint sensing software ("FSS") is used by processor 16 so as to establish, analyze, and issue results based upon, the data in fingerprint table $16_F$.

Turning now to the data in fingerprint table $16_F$ as shown in FIG. 3a, and by way of logical illustration but not necessarily as required in physical memory addresses, fingerprint table $16_F$ includes a number N of columns. In some embodiments, the values at each column correspond to a respective operational condition ("OCx"; x=1, 2, 3, etc.) at a location in handset 10 as monitored by a respective verification sensor VSy (i.e., y=1, 2, 3 etc. for the example of FIG. 2). Thus, for example with respect to verification sensor VS1, each of the N columns may represent the voltage difference between nodes $24_{POS}$ and $24_{NEG}$ under N respective different operational conditions OCx. As discussed later, the different operational conditions are preferably knowingly imposed on the monitored location so as to generate the values for table $16_F$. For example, verification sensor 1 VS1 may measure operational condition OC1 at the monitored location by operating a clock at a first frequency that will impact the value measured at that location, while verification sensor 1 VS1 may measure operational condition OC2 at the same monitored location by operating the clock at a second frequency that also will impact the value measured at that location, and so forth for N different clock frequencies. Other examples with respect to measured values and verification sensors 2 VS2 and 3 VS3 are explored later herein.

Looking now to the rows of fingerprint table $16_F$ in FIG. 3a, only the top and bottom rows are shown as completed and in some embodiments they represent initial parameters ("IP") that are preferably determined, configured and stored in handset 10 at the time of pre-manufacture, manufacture, or testing of handset 10. These values are suitably stored in some other memory and either only accessed from there or copied, such as at each start-up of handset 10, into fingerprint table $16_F$. Looking more specifically at the values in the top and bottom rows for a given column x, preferably they are either predicted from the process flow or measured from a test device or production device with the application of the operational condition OCx to the location monitored by the verification sensor VSy that corresponds to table $16_F$. More particularly, the circuits in a cell phone are design-dependent and original equipment manufacturer (OEM)-dependent in components and physical layout. Accordingly, in the desired phase of pre- or post-manufacture, the initial parameters IP for fingerprint table $16_F$ are determined for storage to handset 10 by impedance-testing or projecting for the design, and these values are suitably stored to some non-volatile memory (e.g., flash) or a patch to Secure ROM is provided in some embodiments, as well as a certificate for integrity verification of these initial parameters. The certificate for integrity is bound to an identifier for the handset product line and/or device bound relative to the handset unit. The identifier for the handset product line is suitably stored in secure ROM or other on-chip non-volatile element. Also, some embodiments generate the parameters automatically in each product unit in manufacture on the fly. The initial parameters for fingerprint table $16_F$ are loaded or downloaded, authenticated, and stored in secure memory (e.g., RAM) when fingerprint sensing software FSS is executed.

Looking now more particularly to the organization of data within fingerprint table $16_F$ and the specific measures of the initial parameters IP, the top row in each column stores the measured or predicted highest anticipated or acceptable value of the parameter under the operational condition OCx for that column, and the bottom row in each column stores the measured or predicted lowest anticipated or acceptable value of the parameter under the operational condition OCx for that column. Looking then in the first column and to further appreciate the naming conventions of the values therein, the top row for the first operational condition OC1 stores or configures the initial parameter high level ("IPHL") for that operational condition OC1 and, thus, appended to the "IPHL" is the subscript OC1. Similarly, the bottom row for the first operational condition OC1 stores or configures the initial parameter low level ("IPLL") for that operational condition OC1 and, thus, appended to the "IPLL" is the subscript OC1. Similarly therefore, in the second column of table $16_F$ and which therefore corresponds to operational condition OC2, the top row for operational condition OC2 stores the initial parameter high level IPHL for that operational condition OC2 and is thusly designated $IPHL_{OC2}$, and the bottom row for operational condition OC2 stores the initial parameter low level IPLL for that operational condition OC2 and is thusly designated $IPLL_{OC2}$. Any remaining values in table $16_F$ may follow such a convention, including the Nth column corresponding to the Nth operational condition at the monitored location. Thus, returning to the example mentioned above with respect to verification sensor 1 VS1 measuring different operational conditions corresponding to different oscillator or clock frequencies, then the value $IPHL_{OC1}$ represents the anticipated or acceptable highest level of the parameter as between nodes $24_{POS}$ and $24_{NEG}$ when the clock frequency is at the first value, and the value $IPLL_{OC1}$ represents the anticipated or acceptable lowest level of the parameter as between nodes $24_{POS}$ and $24_{NEG}$ when the clock frequency is at the first value; similarly, the value the value $IPHL_{OC2}$ represents the anticipated or acceptable highest level of the parameter as between nodes $24_{POS}$ and $24_{NEG}$ when the clock frequency is at the second value, and the value $IPLL_{OC2}$ represents the anticipated or acceptable lowest level of the parameter as between nodes $24_{POS}$ and $24_{NEG}$ when the clock frequency is at the second value, and so forth for the N columns. Given the preceding and as further detailed below, the data in fingerprint table $16_F$ as shown in FIG. 3a therefore represents in effect a o"fingerprint" of the parameters at a monitored location under N operational conditions, that is, the values reflect the expected operational ranges of handset 10 at that location under proper operations and without any nefarious or unauthorized circuitry or devices connected thereto.

Figure 3B:
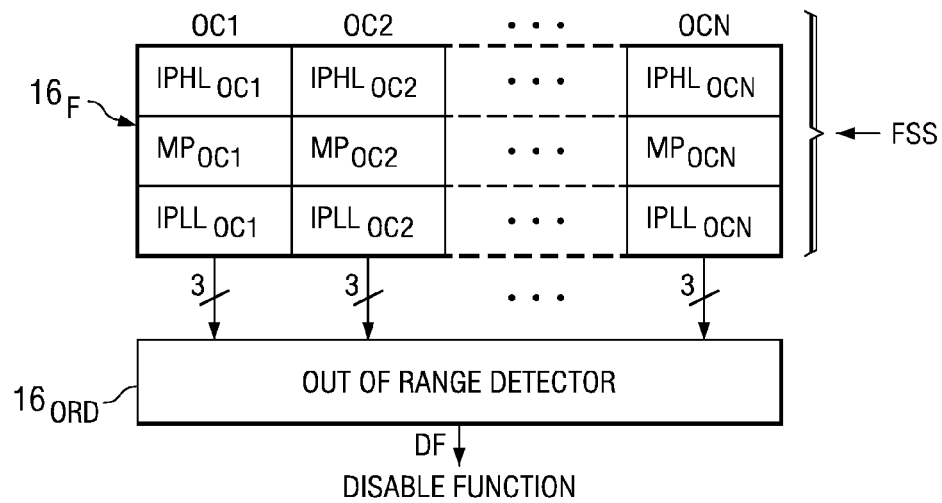
FIG. 3b illustrates a protective circuit including the fingerprint table of FIG. 3a with additional measured parameters stored therein.

FIG. 3b illustrates fingerprint table $16_F$ from FIG. 3a, but after a verification sensor VSy has probed the node(s) to which it is connected, that is, it has measured the parameter associated with that sensor and for the different operational conditions OC1 through OCN and the fingerprint sensing software FSS has stored those measured parameters MP into table $16_F$. Thus, for sake of reference, each measured parameter is indicated as "MP" with the operational condition number (i.e., from OC1 to OCN) added as a subscript thereto. Accordingly, in addition to the values in the top and bottom rows of each column as discussed above with respect to FIG. 3a, in FIG. 3b each middle row contains a corresponding measured parameter. By way of example, therefore, for operational condition OC1, the measured parameter $MP_{OC1}$ is stored in the middle row of the column (1) corresponding to that condition, and $MP_{PCx}$ for column x. Further, the manner in which such parameters are measured depends on the particular verification sensor VSy, with some embodiment examples described later herein.

FIG. 3b further illustrates that each of the three values per column of fingerprint table $16_F$ are logically connected to an out of range detector $16_{ORD}$. With table $16_F$ as readable by or within processor 16, then detector $16_{ORD}$ is a function that is implemented as by comparator circuitry, or by programming code as part of the fingerprint sensing software FSS that is executed by processor 16. In some embodiments an operating system OS of processor 16 in FIG. 2 has access, via an Application Peripheral Interface ("API"), to software FSS and that software provides sufficient reads of data, logical operations, and controls. Detector $16_{ORD}$ operates to evaluate each measured parameter MP for a given operational condition OCx to determine if the parameter is out of the range defined by between the initial parameter high IPHL and initial parameter low IPLL for that condition. For example with respect to operational condition OC1, then with access to the respective level values of $IPHL_{OC1}$ and $IPLL_{OC1}$, detector $16_{ORD}$ is thereby notified of a range for normal operation of the subject parameter for that condition, that, with the range being defined with $IPHL_{OC1}$ as the maximum of the range and $IPLL_{OC1}$ as the minimum of the range. In response, detector $16_{ORD}$ determines whether the measured parameter $MP_{OC1}$ is outside that range; if an out-of-range determination occurs, then detector $16_{ORD}$ asserts a disable function ("DF") control signal so as to disable (or maintain status quo of) a function or functions associated with the operational condition OCx. The disable function DF signal is implemented in various fashions, and in an embodiment detailed later herein, it is provided to a separate protective disable circuit PDC shown as part of power management function 18 in FIG. 2. Returning to detector $16_{ORD}$, if the measured parameter $MP_{OCx}$ for the corresponding operational condition OCx is within range, the disable function DF signal is not asserted and, as further appreciated below, the function or functions associated with the condition are permitted to occur as in normal operations of handset 10. Note also that either concurrently or serially, detector $16_{ORD}$ provides the same determination for all measured parameters with respect to their respective ranges, as defined by their respective IPHL and IPLL columnar values. Thus, in the example of FIG. 3b, detector $16_{ORD}$ evaluates measured parameter $MP_{OC2}$ relative to the range defined between $IPHL_{OC2}$ and $IPLL_{OC2}$, and so forth for all other conditions, up to and including detector $16_{ORD}$ evaluating measured parameter $MP_{OCN}$ relative to the range defined between $IPHL_{OCN}$ and $IPLL_{OCN}$. If any one (or more) of these determinations results in an out-of-range determination, then the disable function DF signal is asserted. Thus, the disable function in some embodiments is generated by or related to a logical-OR of out-of-range comparisons of the measurements MP with the ranges bounded by IPHL and IPLL for each operational condition OCx. The DF signal disables the associated function as further illustrated later herein.

In FIG. 2, verification sensor 1 VS1 probes the voltage and/or change therein, between nodes $24_{POS}$ and $24_{NEG}$. A corresponding fingerprint table $16_F$ is created, and verification sensor 1 VS1 measures that voltage or change therein as a measured parameter MP under different operational conditions, such as by loading battery 24 with a clock circuit that is driven at a first speed to create operational condition OC1, a second speed to create operational condition OC2, and so forth up to an Nth clock speed to create operational condition OCN. At each speed, the measured parameter $MP_{OCx}$ is recorded in the middle row of the corresponding fingerprint table $16_F$. Thereafter, the measured parameter (e.g., voltage) is compared to the range defined by the $IPHL_{OCx}$ and $IPLL_{OCx}$ values for that same operational condition OCx. If each measured value is within the range defined by its respective $IPHL_{OCx}$ and $IPLL_{OCx}$ values for that same operational condition OCx, then normal operations of handset 10 proceed. However, if any measured parameter is outside the range defined by its respective $IPHL_{OCx}$ and $IPLL_{OCx}$ values for that same operational condition, then the disable function DF signal is asserted, and that signal causes one or more functions to be disabled, such as in conjunction with protective disable circuit PDC. In other words, under ordinary, proper, and authorized operation of handset 10, then any verification sensor VSy should measure parameters that are within range as defined by a respective fingerprint table $16_F$. However, if an unauthorized circuit (e.g., unauthorized addition, bypass, modification, or removal of circuitry) has been made to handset 10, then a change in a measured parameter MP is thereby detected as out of range by a verification sensor VSy probing the circuitry to which the unauthorized circuit has been connected. As a result of the detected change, the corresponding verification sensor VSy disables a function or functions to render those functions more tamper resistant and less amenable to unauthorized use.

At the time handset 10 is manufactured, and prior to handset 10 being accessed by an unauthorized user, initial parameter high IPHL and initial parameter low IPLL values are provided to a flash memory 28 coupled to processor 16 in handset 10. Those values are copied during normal operation of processor 16 into the top and bottom rows of a corresponding fingerprint table $16_F$ in FIG. 3. Thereafter, at different times, such as at each start-up of handset 10, at times thereafter, and each time one or more functions are requested or called to occur, then immediately prior to effecting that function (e.g., a ring or a vibrate), verification sensor VS1 measures, for each one of various operational conditions, a respective voltage between nodes $24_{POS}$ and $24_{NEG}$ and stores those values into the middle row of fingerprint table $16_F$ as in FIG. 3b. Due to various manufacturing attributes of contemporary handsets 10, such as mass production manufacture, the voltage behavior and impedance of the cell phone products are relatively uniform and predictable from unit to unit of the same product. Thus, this uniformity is projected, such as in a Gaussian distribution and from which the IPHL and IPLL levels are either measured or computed from a designer-determined number of standard deviations bounding acceptable manufacturing variations. In contrast, an unauthorizedly-modified handset is not likely to track the manufacturing characteristics of a well-developed cell phone technology and affects the operational parameters at the point(s) monitored by verification sensor 1 VS1. In other words, unauthorized modification would change the electrical characteristics (e.g., impedance, voltage behavior, frequency response) as between nodes $24_{POS}$ and $24_{NEG}$; thus, when verification sensor 1 VS1 thereafter measured its probed parameters at the different operational conditions OC1 through OCN, at least one of the corresponding measured parameters $MP_{OC1}$ through $MP_{OCN}$ presents an out-of-range value that is detected by detector $16_{ORD}$ of FIG. 3b. The operational conditions in some embodiments are accomplished by cycling through different clock speeds, such as by loading battery 24 to drive an oscillator or the like at each of those speeds as in FIG. 4, described below. Different clock speeds are introduced because unauthorized modification alters the impedance of the circuits at DC and low frequencies, and/or has a geometry that introduces capacitance and inductance that offers detectable impedance alteration at high frequencies in the high megahertz range. Oscillator frequencies up to 1000 MHz or higher are suitably derived from pre-existing cell phone oscillator circuitry and in some embodiments are used as a rate for the verification sensor. Some devices have a 32 KHz real time clock oscillator and a high-megahertz microprocessor clock oscillator. Various pulse rates and oscillator frequencies are suitably applied as a probe. Also, since the pulses have rich spectral content, significant impedance variations, impedance discontinuities, frequency dispersion, frequency addition, multiplication and subtraction due to nonlinearities can occur and furthermore echoes and variations in spectral and statistical properties can occur. Various embodiments detect any one, some or all of these effects that are introduced, altered or removed by unauthorized circuitry and thus differ from the state of the authorized manufactured product unit. Also, low level RF (prior to the RF PA radio frequency power amplifier of the cell phone) at cell phone frequencies is suitably also used to sense parasitic impedance of unauthorized circuitry and variations therein.

Thus, with a verification sensor VSy having measurements at different frequencies (including frequency=0 Hertz, that is, a DC value), at least one of these measurements is very likely to demonstrate the out-of-range condition caused by unauthorized modification. When verification sensor 1 VS1 detects the out-of-range response from an unauthorized modification, then ringer/vibrator 26 is disabled (e.g., by protective disable circuit PDC). Recalling that the nefarious user may intend for that very ringer/vibrator 26 to become energized, note that such energization is now thwarted. The verification sensor VSy is suitably built into power management function 18 of FIG. 1 so that unauthorized disabling of this protective circuitry is likewise thwarted.

Figure 4:
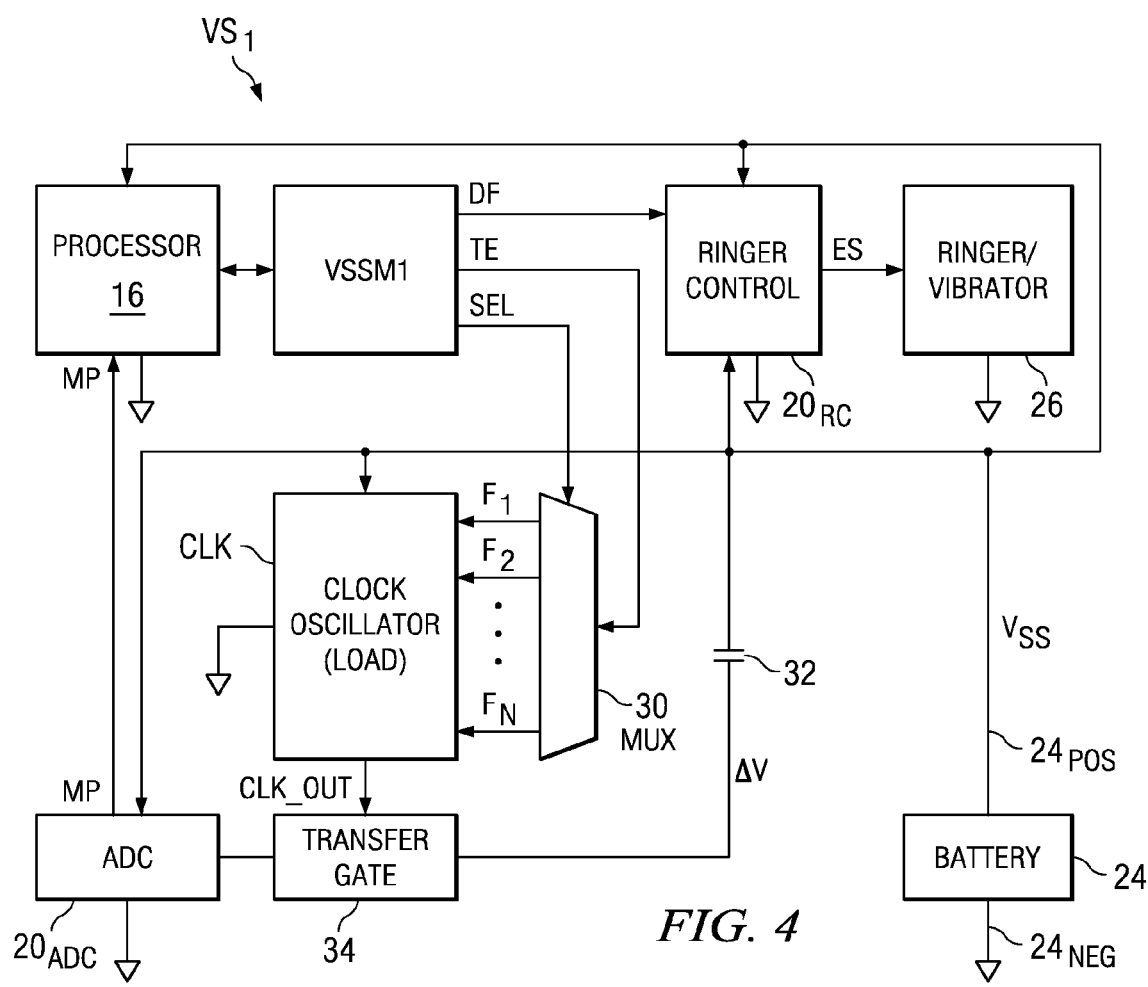
FIG. 4 illustrates an electrical functional block diagram of certain components that form a verification sensor such as verification sensor 1 VS1 from FIG. 2, along with other components in cooperation therewith.

FIG. 4 illustrates an example of verification sensor 1 VS1, where common elements and reference numbers from earlier Figures are carried forward and where verification sensor 1 VS1 is implemented using various blocks, including a verification sensor 1 state machine VSSM1. Implemented aspects of a verification sensor VSy are achieved by re-using available existing circuits associated with handset 10, such as an analog-to-digital converter $20_{ADC}$ in FIG. 4, e.g., from analog baseband circuit 20 of FIG. 2. In circuit 20, an existing ADC may be otherwise unused and thus available at a time when an incoming communication is making a ring request that is to be evaluated by the protective circuitry herein. This approach minimizes the costs of implementing the embodiments while realizing the benefits thereof. Looking then to FIG. 4, processor 16 is again shown in communication with verification sensor 1 VS1. Sensor 1 VS1 either directly provides, or through a more centrally controlled or distributed protective disable circuit PDC provides, the disable feature DF signal to a ringer control $20_{RC}$. The numeral "20" is used in the "$20_{RC}$" designation because ringer control $20_{RC}$ may (or may not) be part of analog baseband circuit 20. Ringer control $20_{RC}$ provides an energizing signal ES to ringer/vibrator 26, so that when signal ES is enabled ringer/vibrator 26 provides a ring and/or vibrate function. When signal DF is generated by verification sensor 1 VS1, signal DF disables signal ES so that ring/vibrate is inhibited. In FIG. 4, battery 24 is coupled by a voltage line $V_{SS}$ (directly or via a voltage regulator that is not shown) to various of the other blocks in FIG. 4 via node $24_{POS}$. The $V_{SS}$ line goes to processor 16, ringer control $20_{RC}$, a clock oscillator CLK, and an analog-to-digital converter ("ADC") $20_{ADC}$. For simplicity, battery 24 is shown directly connected to those blocks, with it understood by one skilled in the art that instead the battery power is or may be coupled to those blocks via power management function 18 of FIG. 2. Note also that each of ringer control $20_{RC}$, clock oscillator CLK, and ADC $20_{ADC}$ may already be used in a device such as handset 10, such as for controlling the ring/vibrate function, clocking the various circuits (where oscillator clock CLK may include more than one clocking circuit, such as a crystal oscillator for lower frequencies and a microprocessor clock to operate processor 16), and converting the analog voice signal into digital form by processor 16, respectively. Indeed, the reference identifier for ADC $20_{ADC}$ includes the "20" because this ADC may be included in analog baseband circuit 20 as discussed earlier. In any event, therefore, the functionalities of these otherwise-available blocks are made additionally available to the verification sensor circuitry of FIG. 4. FIG. 4 also illustrates that one node of a capacitor 32 is connected to node $24_{POS}$ and the other capacitor node is coupled to an input of a transfer gate 34. Transfer gate 34 passes the signal ΔV (delta-V, change in voltage) when enabled. Clock output signal, CLK_OUT, is connected from clock oscillator CLK as an enabling signal to transfer gate 34. Further, the output of transfer gate 34 is connected as an input to ADC $20_{ADC}$, and the output of ADC $20_{ADC}$ provides the measured parameter MP discussed above in connection with the middle row of fingerprint table $16_F$. Verification sensor state machine VSSM1 provides a select signal SEL to a multiplexer MUX 30. A test enable TE signal is connected from Verification sensor state machine VSSM1 to an input of multiplexer MUX 30. Further, in accordance with the SEL and TE signals, multiplexer MUX 30 is operable by VSSM1 to request one of N different frequencies $F_1$ through $F_N$ be provided by clock oscillator CLK, as detailed below.

Processor 16, using the FSS software, initially loads N values of IPHL and N values of IPLL into its fingerprint table $16_F$ (see FIGS. 3a and 3b) and thus configures the fingerprint table. Thereafter, verification sensor state machine VSSM1 probes the measured parameter MP at certain times. These times suitably include one or more of: (i) at start-up of handset 10; (ii) various times thereafter (either at a fixed frequency or with some level of randomization); (iii) when a function call or request is made that without the intervention of the tamper-resistant circuit would cause ringer control $20_{RC}$ to assert signal ES to energize ringer/vibrator 26, such as when a telephone call has been received by handset 10, a message or email or beeper request received by it, or an alarm event reaching its prescribed date and/or time; and/or (iv) any other operation initiating substantial battery current onset or cessation. Thus, at these events, state machine VSSM1 establishes the operational conditions for generating the measurement parameter MP for those different conditions OCx. In the example of FIG. 4 the conditions are at different frequencies and the measured parameter MP, in analog form, is the voltage $\Delta V$ delivered by capacitor 32 and transfer gate 34 to ADC $20_{ADC}$. Note also that at least over the time period during which such measurements are made, the disable signal DF is asserted so as to disable ringer control $20_{RC}$ and consequently prevent ringer/vibrator 26 from ringing/vibrating. If measurement MP is out-of-range for any condition OCx, then the disable signal DF is maintained in the asserted state to disable ringer control $20_{RC}$.

At start-up of handset 10, verification sensor 1 VS1 asserts the disable feature DF signal, and it also asserts its test enable TE signal to multiplexer MUX 30. At the same time, verification sensor 1 VS1 asserts the select signal SEL to choose one of N frequency request signals $F_1$ through $F_N$. To simplify the present explanation, assume that frequencies $F_1$ through $F_N$ are in increasing order of magnitude and that the selection thereof is in respective sequential order. Accordingly, at a first time $t_1$, select signal SEL is asserted so that multiplexer MUX 30 outputs a signal requesting (or controlling) clock oscillator CLK to output a signal CLK_OUT at a frequency of $F_1$. At the same time, battery 24 sources the supply voltage $V_{SS}$ to clock oscillator CLK. In other words, under this configuration and following time $t_1$, clock oscillator CLK provides a load to battery 24. Moreover, as clock oscillator CLK oscillates to deliver output CLK_OUT transitioning between a high and low signal, the load provided by clock oscillator CLK changes with each rise and fall of the resultant CLK_OUT signal; additionally, the magnitude of the load is also affected by the specific output frequency, which in the present example is $F_1$. Given these fluctuations in the load on battery 24, the voltage at node $24_{POS}$ likewise fluctuates, and that changing voltage will develop a varying voltage $\Delta V$ at capacitor 32. Still further, the CLK_OUT signal enables transfer gate 34, thereby coupling the voltage $\Delta V$ at capacitor 32 to provide an input to ADC $20_{ADC}$. Where ADC $20_{ADC}$ is already included in handset 10 to accommodate conversion of voice signals collected by microphone MIC (see, e.g., FIG. 2), and since the microphone voltage is quite low, the sensitivity of the ADC $20_{ADC}$ is also adequate for use with verification sensor 1 VS1 (or other verification sensors). ADC $20_{ADC}$ converts the analog signal $\Delta V$ to a digital counterpart, and that counterpart therefore is a measured parameter, MP, that is related or corresponds to the load on battery 24 as reflected by its available energy at node $24_{POS}$ for a frequency supply of $F_1$. Verification sensor 1 VS1 thus provides a value of a measured parameter MP corresponding to a first operational condition, OC1. The value of measured parameter MP is substantially the magnitude of the voltage $\Delta V$ at capacitor 32 when clock oscillator CLK is caused to provide an output frequency signal of $F_1$. Accordingly, as measured parameter MP is further provided to processor 16, that value of measured parameter MP is stored into the middle row of its fingerprint table $16_F$ of FIG. 3b.

After the preceding steps are achieved for frequency $F_1$, at a time $t_2$ verification sensor 1 VS1 maintains the test enable signal TE yet changes the select signal SEL so that multiplexer MUX 30 next requests that clock oscillator CLK output the frequency $F_2$. In response clock oscillator CLK outputs frequency $F_2$, thereby providing a different frequency of loading on battery 24 and another voltage $\Delta V$ via capacitor 32. Transfer gate 34 is enabled at the frequency $F_2$, and the different $\Delta V$ value is input to ADC $20_{ADC}$, which thereby presents a corresponding digital value of measured parameter MP to processor 16 and its fingerprint table $16_F$. Thus, following time $t_2$, the verification sensor 1 VS1 provides a value of measured parameter MP corresponding to a second operational condition, OC2, again the voltage from capacitor 32, but this time when clock oscillator CLK is caused to provide an output frequency signal of $F_2$. Such operation is established for a total of N different frequency selections by multiplexer MUX 30, each therefore corresponding to a different respective operational condition OCx and each providing a respective measured parameter $MP_{OCx}$ into fingerprint table $16_F$ of FIG. 3b.

Continuing with the operation of the blocks in FIG. 4, and with the various probed measured parameters MP stored as described in the preceding paragraph, processor 16 next determines whether any of the values of those measured parameters $MP_{OCx}$ are outside of their previously-established acceptable respective ranges. Recall that the range for a given value of MP in fingerprint table $16_F$ is defined by a high and low level IPHL and IPLL, respectively. If any measured parameter in fingerprint table $16_F$ is outside of its respective range, then verification sensor 1 VS1 is so informed and the disable feature DF signal is asserted or maintained if it already was asserted, such as at the beginning of the period in which state machine VSSM1 began determining the various measured parameters. In FIG. 4, disable feature DF signal is provided to ringer control $20_{RC}$, and in response to the assertion or maintenance of that signal, ringer control $20_{RC}$ is inhibited from energizing ringer/vibrator 26, that is, energizing signal ES is prevented from being asserted.

Other manners of impeding the operation of a circuit of an electronic device in response to an out-of-range detection are suitably implemented, such as, through direct removal of power to ringer control $20_{RC}$. Still further, if there are other electrical conditions at contacts or on conductors or traces that under normal operation facilitate the normal operation of ringer/vibrator 26, then any of those are interrupted or impeded in response to the assertion to the disable feature DF signal so that ringer/vibrator 26 does not operate when a verification sensor VSy detects an out-of-range condition in fingerprint table $16_F$. As a result, the ring or vibrate function is not achieved when an out-of-range condition is detected, thus thwarting a nefarious goal of an unauthorized circuit.

Otherwise, when the blocks of FIG. 4 operate as described above but the voltage ΔV provided by capacitor 32 for each operational condition (e.g., each different frequency $F_1$ through $F_N$) is within each respective range defined in fingerprint table $16_F$ of FIG. 3b, then disable feature DF signal is not asserted in FIG. 4 and ringer control $20_{RC}$ is permitted to operate as in the usual manner, that is, to assert the energizing signal ES when appropriate and so as to cause ringer/vibrator 26 to operate as desired in normal operations of handset 10.

An alternative embodiment is described relative to FIG. 4, but without the use of ADC $20_{ADC}$. Specifically, the load of clock oscillator CLK when it is caused to drive each of frequencies $F_1$ through $F_N$ is known based on the characteristics of handset 10 and its circuitry. As shown above, this known load as applied to battery 24 produces voltage ΔV via capacitor 32. The time interval required for the voltage to reach a measurement threshold, after pulse application of the known load, varies with time depending on the characteristics of the authorized circuitry. Thus, in an alternative embodiment, a threshold detector is connected to monitor ΔV via capacitor 32, and in connection therewith a time interval is measured accurately (e.g., via a counter such as using digital circuitry in power management function 18) for the time it takes ΔV to reach the threshold. When no unauthorized circuit has been added to handset 10, then therefore the time it takes ΔV to reach the threshold will be known or, as described above with fingerprint table $16_F$, can be measured and expected to be within a range defined by a high and low initial parameter. However, if during operation the time ΔV takes to reach the threshold falls outside the range, then the disable function DF signal is asserted to disable one or more features (e.g., ringer control $20_{RC}$ and/or ringer/vibrator 26). Another alternative embodiment saves operational time in verification sensing by energizing oscillators to supply plural clock frequencies concurrently. Multiple transfer gates 34 (e.g., 34.1, 34.2, 34.3) are respectively enabled by corresponding clock frequencies and ADC $20_{ADC}$ or threshold device(s) is either muxed or replicated to provide plural $MP_{OCx}$ signals concurrently and in parallel to processor 16.

Figure 5:
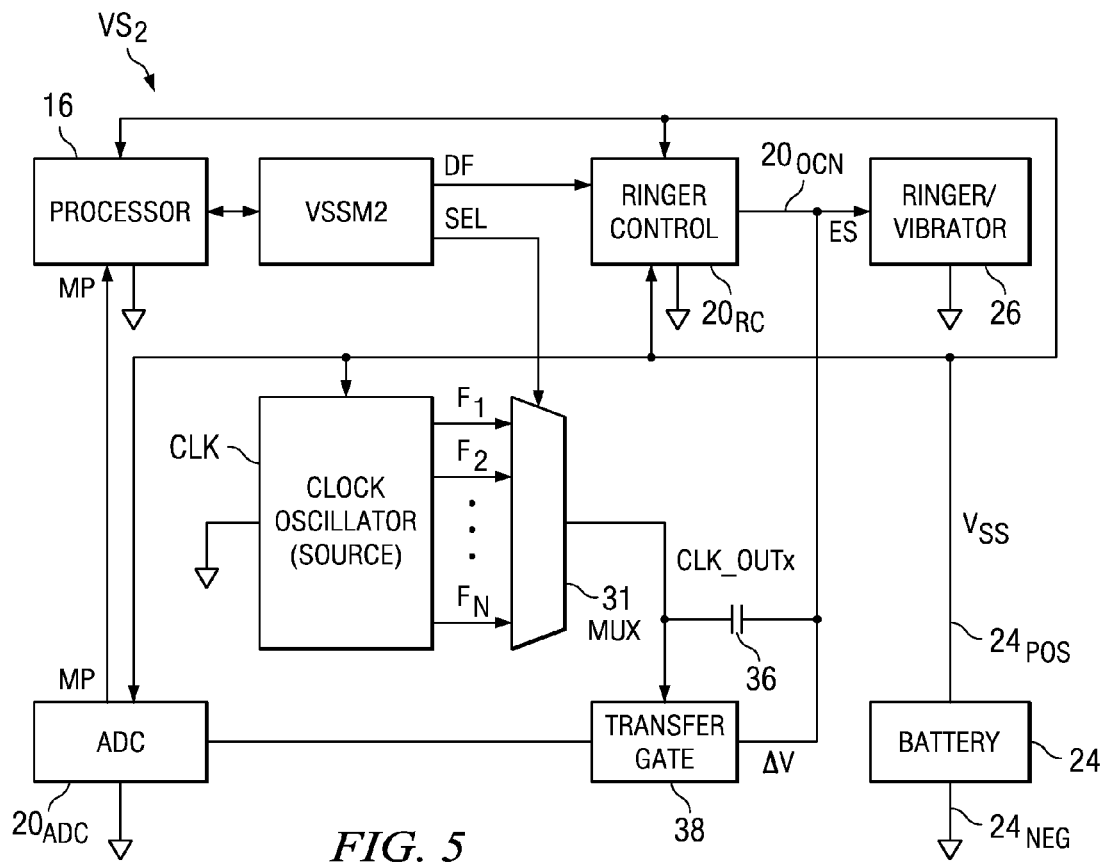
FIG. 5 illustrates an electrical functional block diagram of certain components that form a verification sensor such as verification sensor 2 VS2 from FIG. 2, along with other components in cooperation therewith.

FIG. 5 illustrates an example of verification sensor 2 VS2, which recall from FIG. 2 is connected to a node(s) from which analog baseband circuitry 22 drives ringer/vibrator 26. Verification sensor 2 VS2 has a verification sensor 2 state machine VSSM2. Verification sensor 2 VS2 includes available components in case any such components already exist in a cellular telephone. Indeed, some components from FIG. 4 are carried forward into FIG. 5 and re-used where convenient. The following discussion focuses on the aspects that differ in FIG. 5 as compared to FIG. 4. Further, both figures are by ways of example and alternative blocks and connections are used without departing from the inventive scope.

Turning to structures of FIG. 5 as compared to FIG. 4, the CLK_OUT of clock oscillator CLK has outputs CLK_OUT1, _OUT2, ... _OUTN for frequencies $F_1$, $F_2$, $F_N$ coupled to inputs of a multiplexer MUX 31. One of these inputs is selected by multiplexer MUX 31 and coupled to one node of a capacitor 36. The other node of capacitor 36 is connected to the output control node $20_{OCN}$ of ringer control $20_{RC}$. State machine VSSM2 generates a selector signal SEL to control the selection by multiplexer MUX 31. Verification sensor 2 VS2 probes the impedance of node $20_{OCN}$ to determine if an unauthorized circuit has been coupled to that node. Output control node $20_{OCN}$ is also connected as an input to a transfer gate 38 which, similar to transfer gate 34 of FIG. 4, has its output connected to an ADC $20_{ADC}$. This ADC generates a digital measured parameter MP that is provided back to processor 16 (for storage as in FIG. 3b into the middle row of its fingerprint table $16_F$).

Some embodiments replace capacitor 36 or parallel it with a resistor 36R or other protective circuitry components. The capacitor 36, or resistor 36R, is suitably either integrated into a power management chip, or into a voltage regulator, or simply put on the printed wiring board of the product as a discrete electronic component. Tampering with a discrete capacitor 36 or discrete resistor 36R is defeated and rendered futile since measured parameter MP would immediately become out-of-range relative to the configured limits IPHL-IPLL of the fingerprint $16_F$ table of FIG. 3b.

Another type of embodiment couples both CLK_OUT and capacitor 32 of FIG. 4 to node $20_{OCN}$. Yet another embodiment combines FIGS. 4 and 5 by using both multiplexer MUX 30 to selectively enable a particular oscillator and using multiplexer MUX 31 to select a particular oscillator output. In this way multiplexer MUX 30 and MUX 31 together control and select the oscillators that probe node $20_{OCN}$. Still another embodiment sums outputs from plural clock oscillators at node $20_{OCN}$, and provides plural transfer gates clocked respectively by their clock oscillators to produce outputs that respective ADCs or thresholds to deliver parallel measured parameter values to processor 16.

The operation of the blocks in FIG. 5 is now discussed with some steps briefly mentioned where they were comparably covered with respect to FIG. 4. After processor 16 loads N values of IPHL and N values of IPLL into its fingerprint table $16_F$, then at start-up of handset 10, various times thereafter, and/or when a function call is made for ringer control $20_{RC}$ to assert signal ES to energize ringer/vibrator 26, then verification sensor state machine VSSM2 undertakes to measure parameters at different operational conditions and those parameters are stored in the middle row of fingerprint table $16_F$. In FIG. 5, the conditions are caused again with the use of different frequencies and the measured parameter, in analog form, is the voltage ΔV delivered via capacitor 36. Further, preferably during the time when such measurements are made, disable feature DF signal is asserted so as to disable ringer control $20_{RC}$ and consequently prevent ringer/vibrator 26 from ringing/vibrating. State machine VSSM2, using the same or comparable signal SEL from FIG. 4, causes multiplexer MUX 31 at different times to select among the N different clock oscillator CLK outputs of clock pulses, again described herein as suitably low level, at each selected frequency. In FIG. 5, the CLK_OUTx signal drives capacitor 36 as well as any impedance at output control node $20_{OCN}$. Accordingly, the change in voltage, ΔV across capacitor 36, is impacted by the combined impedance of both capacitor 36 as well as any impedance at output control node $20_{OCN}$. Thus, the initial parameters IPHL and IPLL in fingerprint table $16_F$ are based upon an anticipated range of this impedance at each different frequency $F_1$ through $F_N$. Therefore, under normal operations, without the addition of unauthorized circuitry, the measured amount of voltage change ΔV (change in the voltage between node $20_{OCN}$ and common $24_{NEG}$) is passed by capacitor 36 to ADC $20_{ADC}$, put into digital form as measured parameter MP, and is found by processor 16 to be within range. However, when an unauthorized modification has been introduced at or coupled to output control node $20_{OCN}$, then the voltage change ΔV measured for each different operational condition (e.g., different frequencies $F_1$ through $F_N$) will be detected to be out of range for the initial parameters IPHL and IPLL in at least one instance of a corresponding operating condition OCx. In response to this detection, disable feature DF signal is asserted, or maintained if it already was asserted such as at the beginning of the period in which state machine VSSM2 began determining the various measured parameters, and therefore ringer control $20_{RC}$ does not assert the energizing signal ES and ringer/vibrator 26 is precluded from performing a ringing or vibrating operation.

From the above, one skilled in the art will appreciate that FIGS. 4 and 5 provide some embodiments for a verification sensor. Each of these embodiments is suitably modified or generalized and applied to numerous different locations within the circuitry of handset 10. Indeed, more generally, note that the approach of FIG. 4 lends itself well to instances where a source of energy is available, such as battery 24 but not necessarily limited thereto. In that case, the implementation of verification sensor 1 VS1 provides a load to that energy source and then evaluates a response of that energy source as the load is changed to different operational conditions where the response is determined to be in or out of range of an expected normal range of operation. The approach of FIG. 5 lends itself well to evaluating an expected impedance at a node, where therefore such an evaluation is applied to a node driving any loading circuit. In this case, the implementation of verification sensor 2 VS2 provides a driving signal to the evaluated node and measures the response at that node to the driving signal as the driving signal is changed to different operational conditions, where again the response is determined to be in or out of range of an expected normal range of operation.

Also in connection with either of the approaches of FIGS. 4 and 5 and including the more general applications thereof as described above and still others, some embodiments also contemplate considerations of the magnitude of either the load or the driving signal used for purposes of probing one or more nodes. The additional verification sensors suitably operate in a manner that does not unduly burden battery 24 and avoids rapid discharge. Second, the variation of the handset's respective voltages and currents during operation of a verification sensor is in some embodiments ten percent (10%) or less of the corresponding variation in the same circuit's respective voltages and currents during the functional operation such as ring/vibrate when the sensor permits such functional operation to proceed. Toward this end, in connection with FIG. 4 each clock oscillator load is made relatively light, and in FIG. 5 each clock oscillator output to the ringer is provided at a relatively low magnitude level. This is to ensure that either the battery power consumed in the circuit of FIG. 4 or the oscillator signal as applied to a node (e.g., node $20_{OCN}$, FIG. 5) is not of itself sufficient to be detected by or trigger an unauthorized circuit.

FIGS. 4 and 5 thusly demonstrate alternatives with respect to verification sensors 1 VS1 and 2 VS2, and from these examples one skilled in the art should readily appreciate manners of implementing verification sensor 3 VS3 of FIG. 2. Specifically, to the extent that an energy signal drives one or more nodes for sourcing display 12, including its display elements and/or the back light that may provide additional illumination, or that display 12 and or the back light provides a load to one or more nodes, then in either case the one or more nodes are probed per either FIG. 4 or FIG. 5, and display 12 (including its display elements and/or its back light) is disabled if an out-of-range measured parameter is found at that node; moreover, yet another approach for probing in connection with display 12 is described later hereinbelow in connection with FIGS. 9-10. In the meantime, these various examples illustrate how to probe numerous nodes with respective verification sensors. The functions associated with those nodes are disabled and status quo maintained when a verification sensor finds an out-of-range measured parameter during any of a plurality of operational conditions at that node(s). Indeed, while specific examples have been shown for probing a node and selectively disabling the ringing/vibrating and displaying functions, still other functions may likewise be probed, and selectively disabled when an out-of-range parameter is detected. For example, recall that handset 10 includes an interface I/F, and that interface I/F may provide various connections to peripherals, data transfer, battery power, and the like. In this regard, handset 10 may well include an amplifier or driver to a headphone/earphone jack that is part of interface I/F. Thus, per the inventive teachings herein, one or more nodes associated with either the amplifier, driver, or headphone/earphone jack itself is probed by a verification sensor VSy such that, if an out-of-range condition is detected at the probed node(s), the verification sensor VSy disables (or maintains the status quo at) the amplifier or driver and thereby prevents it from operating in a manner that delivers audio and/or accompanying drive to the headphone/earphone jack in the way that otherwise occurs when ordinary operation of that amplifier or driver is activated. As another example, and recalling that a verification sensor VSy may probe and disable display 12 upon detecting an out-of-range condition at the probed node(s), note that more particularly the display circuit back light, scan, and video driver to the various display control and signal drive points are prevented from being activated (or status quo is maintained) as would otherwise occur for in-range parameters and in response to an incoming phone call, e-mail, alarm clock and/or possibly in response to enablement from a video/audio player. As still another example, certain readable media that may be included in handset 10, or an interface to such media if externally readable from handset 10, also are probed and selectively disabled or status quo maintained in response to an out-of-range measured parameter—or permitted to operate as normal when in-range measured parameters are found. These media and their corresponding functions include a CD (optical compact disk) or hard disk and their respective player motor, driver/amplifier, and LED (activation indicator light-emitting diode) points. As a final example, a verification sensor VSy and its related above-described ability to probe and selectively disable are suitably coupled to either the DTMF decoder input or DTMF output circuit so that an out-of-range condition (e.g., impedance range), as determined by the probing, prevents both the DTMF decoder input and DTMF decoder output from being activated as if by ordinary incoming DTMF tones. The incoming DTMF tones themselves are disabled. (DTMF means dual-tone multi-frequency, commonly known as touch tones.) The VSSM tests to determine whether unauthorized circuitry is present at either the input or output of the DTMF decoder regardless of whether a call is incoming or outgoing, as well as on power up, hard/soft reset, and at other times. Since a cell phone such as handset 10 may be used for emergency outgoing calls, the disable feature DF signal is suitably controlled in some embodiments to permit an outgoing voice conversation but disable the DTMF decoder input and DTMF decoder output and all loads (e.g., ringer, vibrator, hard drive) not needed to support such communication initiated as an outgoing call. Still other examples are ascertainable by one skilled in the art.

Figure 6:
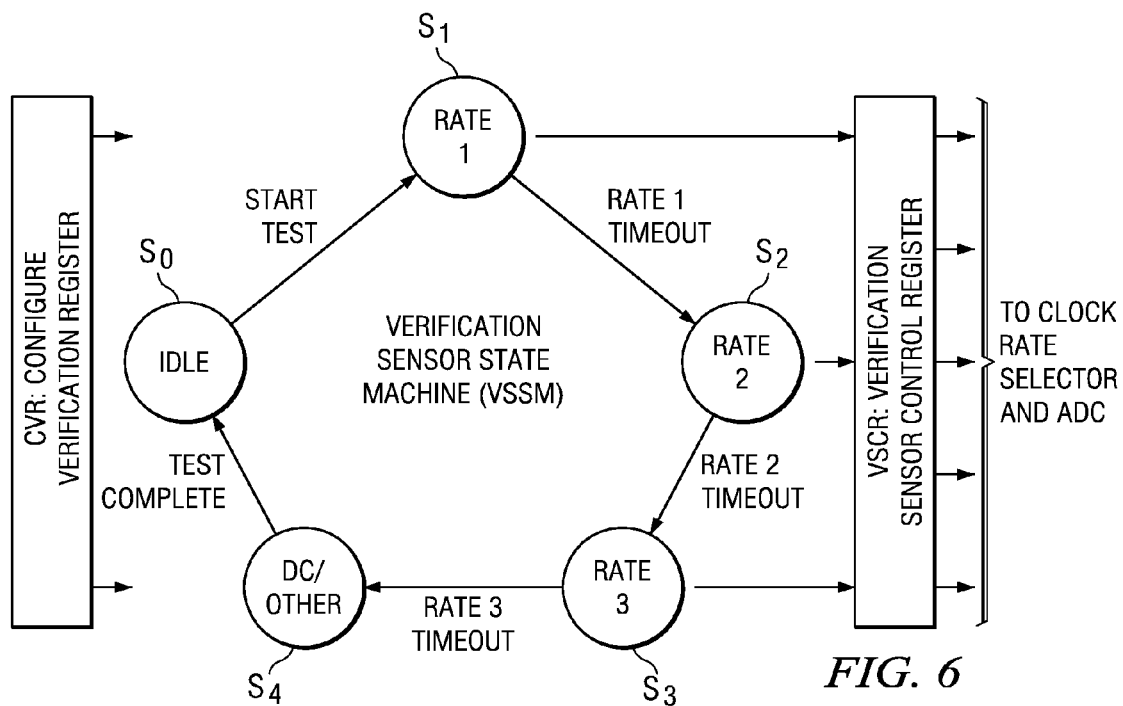
FIG. 6 illustrates a state diagram of the various states of a verification sensor per an embodiment, along with a register for configuring the state machine and a register for reporting information relating to the state machine.

FIG. 6 illustrates various states of a verification sensor state machine VSSM of an embodiment, such as in the example of such state machines VSSM1 and VSSM2 of FIGS. 4 and 5 and for other embodiments. Such a state machine is implemented as sequential logic and is achieved with any of software, firmware, hardware, or a combination thereof. In addition, in FIG. 6 a configure verification register CVR controls the flow from one state to another in a verification sensor state machine VSSM. The states (bubbles in FIG. 6) of VSSM are established in and readable from, a verification sensor control register VSCR. In some embodiments certain register VSCR bits themselves are the storage elements of the circuitry of verification sensor state machine VSSM, and those storage elements correspond to the state bubbles $S_0$-$S_4$ of VSSM in FIG. 6. The bits or fields in each of verification sensor control register VSCR and configure verification register CVR are shown in the following respective Tables 1 and 2:

TABLE 1

VSCR bits

| Bit | Bit Name | Remarks |
|---|---|---|
| 0 | Start_Test | From FSS to VSSM |
| 1 | RATE1_Active | VSSM state output |
| 2 | RATE2_Active | VSSM state output |
| 3 | RATE3_Active | VSSM state output |
| 4 | DCOTHER_Active | VSSM state output |
| 5 | TESTCOMPLETE | From VSSM to FSS |
| 6 | IDLE | VSSM Idle state |
| 7-15 | Reserved | |
| 16-31 | DOWNCOUNTER | Counts Pulses or duration for a test. When zero is reached in the downcounting, a signal timeout is provided to transition VSSM to next state permitted by CVR. |

TABLE 2

CVR bits

| Bit | Bit Name | Remarks |
|---|---|---|
| 0 | START_TEST | From FSS to VSSM |
| 1 | RATE1_Battery | Test Enable by VSSM to VSy that tests energy source (e.g., battery in FIG. 4) at frequency $F_1$ |
| 2 | RATE1_Load | Test Enable by VSSM to to VSy that tests load at node (e.g. $20_{OCN}$ in FIG. 5) at frequency $F_1$ |
| 3 | RATE2_Battery | Test Enable by VSSM to VSy that tests energy source (e.g., battery in FIG. 4) at frequency $F_2$ |
| 4 | RATE2_Load | Test Enable by VSSM to to VSy that tests load at node (e.g. $20_{OCN}$ in FIG. 5) at frequency $F_2$ |
| 5 | RATE3_Battery | Test Enable by VSSM to VSy that tests energy source (e.g., battery in FIG. 4) at frequency $F_3$ |
| 6 | RATE3_Load | Test Enable by VSSM to to VSy that tests load at node (e.g. $20_{OCN}$ in FIG. 5) at frequency $F_3$ |
| 7 | DC_Battery | Test Enable by VSSM to VSy that tests energy source (e.g., battery in FIG. 4) at frequency $F_N$, where $F_N = 0$ Hertz (i.e., DC value). Some embodiments detect transients as well as quiescent values. |
| 8 | DC_Load | Test Enable by VSSM to to VSy that tests load at node (e.g. $20_{OCN}$ in FIG. 5) at frequency $F_N$, where $F_N = 0$ Hertz (i.e., DC value). Some embodiments detect transients as well as quiescent values. |
| 9 | PHONE_Call | Enable VSSM by Phone Call |
| 10 | E_Mail | Enable VSSM by E-Mail |
| 11 | ALARM_Clock | Enable VSSM by Alarm Clock |
| 12 | CD_VideoAudio | Enable VSSM by CD player |
| 13 | DISABLE_Ringer | DF signal asserted to PDC for Ringer |
| 14 | DISABLE_Vibrator | DF signal asserted to PDC for Vibrator |
| 15 | DISABLE_Display | DF signal asserted to PDC for Display |
| 16 | DISABLE_HardDrive | DF signal asserted to PDC for Hard Drive |
| 17 | DISABLE_Speaker | DF signal asserted to PDC for Speaker |
| 18 | DISABLE_Headphone | DF signal asserted to PDC for Headphone |
| 19 | DISABLE_CDplayer | DF signal asserted to PDC for CD Player |

TABLE 2-continued

CVR bits

| Bit | Bit Name | Remarks |
|---|---|---|
| 20 | DISABLE_DTMF | DF signal asserted to PDC for DTMF decoder input and output circuitry |
| 21 | INITIATE_DISABLE | Master Disable to PDC From FSS is qualified for various PDC outputs by DISABLE_<Load> bits 13-19 respectively. |
| 22-31 | Reserved | |

From Table 2, configure verification register CVR configures the state machine VSSM for the types of tests 1-8 to be enabled as the state machine VSSM sequences through states permitted by register CVR and skips any states not enabled by register CVR. Verification Sensor Control Register VSCR of Table 1 acts as the storage elements of, or responds to, the state machine VSSM to set and reset bits 0-4 of Table 1 (States $S_0$, $S_1$, $S_2$, $S_3$, $S_4$ of FIG. 6) pertaining to each test. Register CVR also holds various test-activating options in bits 9-12 of Table 2 such as phone call, e-mail, alarm clock, and other activating events. In Table 2, register CVR further holds various options for controlling the PDC disables by bits 13-20.

In FIG. 6, when a latest state bit among bits 0-4 for register VSCR is set by sequencing VSSM in FIG. 6, then a particular test is enabled. The register VSCR bits are used to establish a selection SEL request or cause the output of a frequency designated thereby, such as illustrated by way of example with multiplexer MUX 30 of FIG. 4 or with multiplexer MUX 31 of FIG. 5 above. Also the register VSCR bits are used to configure ADC $20_{ADC}$ of either FIG. 4 or 5 and couple its input(s) via transfer gate 34 and capacitor 32 to the circuitry in handset 10 to be probed, and couple its output (s) to the input for digitized measurement parameter MP to processor 16. Looking to the states in FIG. 6, state machine VSSM defaults to IDLE state $S_0$. Thereafter, state machine VSSM proceeds as follows.

On receipt of START TEST signal from processor 16, state machine VSSM transitions from IDLE state $S_0$ to RATE1 state $S_1$ and sets the RATE1_Active bit in the VSCR and loads a Down Counter to a predetermined count from a RATE-COUNT1 register. The bit RATE1_Active controls multiplexer MUX to supply RATE 1 pulses (e.g., frequency $F_1$) to probe the corresponding (e.g., power or load) circuitry.

When Down Counter times out, RATE1_TIMEOUT signal goes high and transitions state machine VSSM from RATE1 state $S_1$ to RATE2 state $S_2$. Thereupon state machine VSSM resets the RATE1_Active bit in the VSCR and sets the RATE2_Active bit in the VSCR. Also, state machine VSSM loads the Down Counter to a predetermined count from a RATECOUNT2 register. The bit RATE2_Active controls multiplexer MUX to supply RATE 2 pulses (e.g., frequency $F_2$) to probe the power and/or load circuitry.

When Down Counter next times out, RATE2_TIMEOUT signal goes high and state machine VSSM transitions from RATE2 state $S_2$ to RATE3 state $S_3$. Thereupon state machine VSSM resets the RATE2_Active bit in the VSCR and sets the RATE3_Active bit in the VSCR. Also, state machine VSSM loads the Down Counter to a predetermined count from a RATECOUNT3 register. The bit RATE3_Active controls multiplexer MUX to supply RATE 3 pulses to probe the power and/or load circuitry.

When Down Counter next times out, RATE3_TIMEOUT signal goes high and state machine VSSM transitions from RATE3 state $S_3$ to DCOTHER state $S_4$. Thereupon state machine VSSM resets the RATE3_Active bit in the VSCR and sets the DCOTHER_Active bit in the VSCR. Also, state machine VSSM activates DC (e.g., frequency $F_N$=DC) and other tests. The DC test suitably checks not only quiescent DC voltage but also transient voltage. Upon completion of DC and other tests, hardware generates a signal TESTCOMPLETE to state machine VSSM and to processor 16. VSSM resets DCOTHER_Active bit in the VSCR and sets the IDLE bit in the VSCR so that state machine VSSM transitions from DCOTHER state $S_4$ back to IDLE state $S_0$.

In connection with a further embodiment, the initial parameter high IPHL and initial parameter low IPLL levels are, after being stored to handset 10, thereafter adjusted by software FSS based on one or more aspects that may affect handset 10. Such a range further benefits from a dynamic adjustment based on environmental conditions and contexts affecting handset 10. As an example of such an operating condition, the IPHL and IPLL values are adjusted based on the then-existing amount of charge in battery 24. In some embodiments, the initial values of IPHL and IPLL loaded into fingerprint table $16_F$ reflect an expected voltage for a predetermined value of battery charge level (such as 80% charged, fully charged, half-charged, or some other predetermined value). In some embodiments those values $IPHL_{OCx}$ and $IPLL_{OCx}$ are adjusted by processor 16 as the amount of charge in battery 24 discharges. Further in this regard, FIG. 7 illustrates a flowchart of an implementation of an adjustment method 40.

Figure 7:
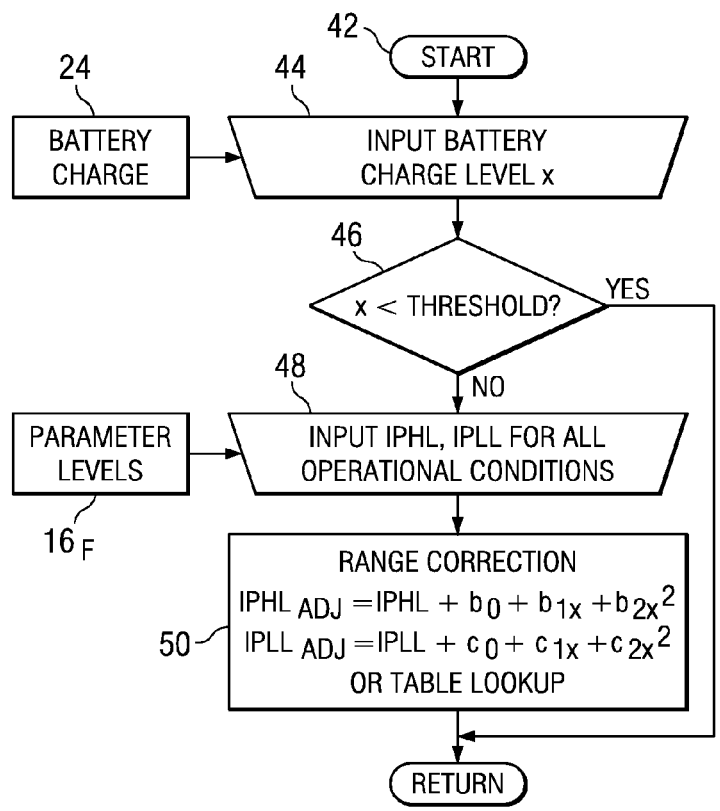
FIG. 7 illustrates a methodology for changing the initial parameter values per an embodiment.

In FIG. 7, a start step 42 is reached, such as by software FSS calling a routine that includes method 40, at which time method 40 continues to data input step 44. Step 44 is shown as a trapezoid to represent that data is provided as an input to that step. Specifically, in step 44, the present charge level of battery 24 in handset 10 is obtained. Note that the amount of such battery charge, either as an absolute value or a percentage x of full charge, is provided by any appropriate battery monitoring circuit such as a current integrator of power management function 18 of FIG. 2 coupled to the battery and is read by power management function 18. Step 44 receives a value of x that represents the percentage of charge that battery 24 then has relative to a full charge of one hundred percent.

Next, a step 46 determines whether the value x from step 44 is below a predetermined threshold. In the example of step 46, the threshold is set at 5%. If this condition is satisfied, then step 46 has determined that battery charge is insufficient for various operations of handset 10, and operations suitably go to a RETURN to other software that disables the phone and prevents ring. However, if the value of x exceeds (or is equal to) the step 46 condition, then method 40 proceeds to step 48.

Step 48 first reads, from fingerprint table $16_F$, the initial parameters IPHL and IPLL from flash memory 28 of FIG. 2 for each different operational condition OC1 through OCN. Next, method 40 continues to step 50.

In step 50, method 40 adjusts each of the initial parameter values read in step 48, that is, each such value is re-calculated to a new value. Thus, the values are adjusted based on the particular type of operational condition OCx to which they apply and in view of how that operational condition will be affected based on the diminution in charge of battery 24 as represented by x. The adjustments are suitably calculated, for example by applying a quadratic approximation as shown in FIG. 7. In general the values $IPHL_{ADJ}$ and constants $b_0$, $b_1$, $b_2$ and the values $IPLL_{ADJ}$ and constants $c_0$, $c_1$, $c_2$ are different for each operating condition (e.g. probe rate) OCx. In an alternative process embodiment, the adjustments are obtained by accessing a lookup table (not shown) pre-stored in a flash memory 28 that provides a new value of $IPHL_{ADJ}$ and $IPLL_{ADJ}$ for each operational condition corresponding to the current value of x. Once the adjustments are accomplished, the adjusted values of $IPHL_{ADJ}$ and $IPLL_{ADJ}$ are written into fingerprint table $16_F$ to thereby overwrite the initial values, or they alternatively are stored elsewhere and used for the next determination of an in-range or out-of-range condition with respect to a measured parameter MP, thereby leaving the initial values of IPHL and IPLL intact in fingerprint table $16_F$. Those initial values are later adjusted yet again based on a still different amount of battery charge x then in existence at the time of that later adjustment. Following step 50, method 40 returns so that the newly-adjusted values of $IPHL_{ADJ}$ and $IPLL_{ADJ}$ define a range for evaluating whether a corresponding measured parameter MP falls within that range.

In FIG. 7, method 40 illustrates adjustment of the values of initial parameters IPHL and IPLL for different operating conditions OCx and based on present battery charge level. Note that battery charge is only a particular example of a variable affecting operation of the verification sensor VSy. Thus, in other embodiments the basis of changing these initial parameters IPHL and IPLL are based on some other variable affecting that operation, and each such other variable is in addition to or in lieu of battery charge level. For example, another such variable is ambient temperature or still another is temperature internal to the housing that surrounds handset 10 that is measured and used as a basis to adjust the values of IPHL and IPLL for the respective operating conditions. Thus, in this or other implementations using additional variable(s) beyond battery charge level x, the additional variables are input at step 44 along with the battery charge level x, and the correction functions including the additional variables are computed. The corrections in some embodiments are linear, quadratic, cubic, higher-order, multi-variate, and other types of corrections.

Figure 8:
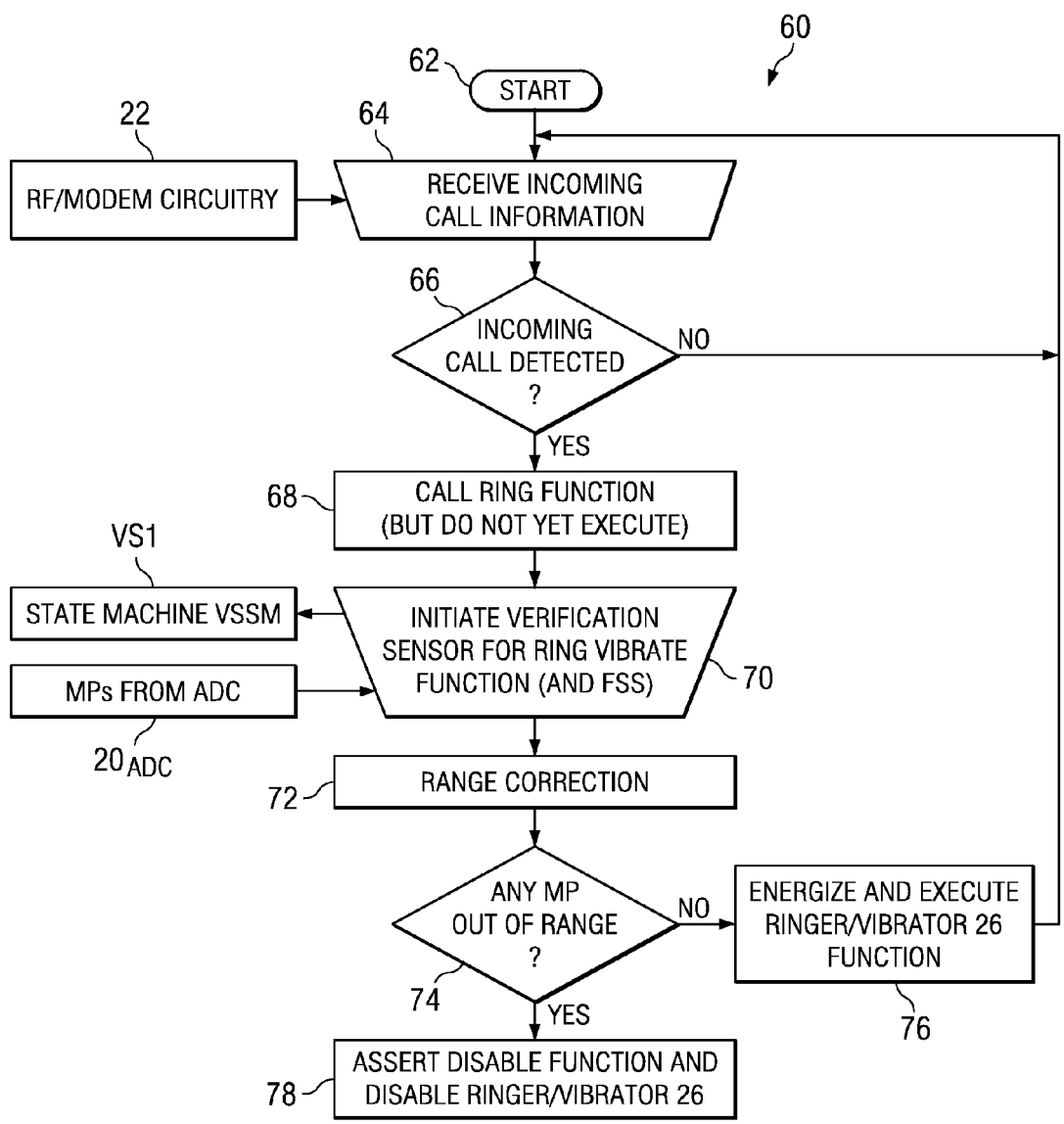
FIG. 8 illustrates a flowchart illustrating various operational aspects of an embodiment.

FIG. 8 illustrates a flowchart of a process 60 of operation of handset 10 using the example of verification sensor 1 VS1. Following a start step 62, in step 64 handset 10 receives incoming call information, such as from RF/wireless modem circuitry 22,20,16. In response, the call information is processed, such as by detecting the incoming call information to determine if the user of handset 10 is to be alerted, as is shown in step 66. If not, or if no incoming call, method 60 returns to step 64 to await a call, but if so method 60 continues to step 68. In step 68, a program call, or other signal request, is made to the ring and/or vibrate function. However, as a protective measure, that request is not immediately satisfied. Execution of the request is delayed (in many embodiments the delay is quite acceptable to the ordinary user and may even be imperceptibly short due to the electronic speed) and possibly denied based on the remaining steps of method 60. Particularly, in the following step 70, the verification sensor for the ring/vibrate function (e.g. sensor 1 VS1) is initiated, such as by starting its state machine VSSM. The state machine VSSM proceeds per the discussion of FIG. 6 and in doing so the various measured parameters MP are returned by ADC $20_{ADC}$ to step 70 in digital form. Thereafter, in an optional step 72, a range correction is made to the IPHL and IPLL values per FIG. 7, after which in step 74 determines if any of the MPs are outside of the respective ranges of FIG. 3b provided by the IPHL and IPLL values (corrected or original). If all MPs are within the respective ranges provided by the IPHL and IPLL values, then the flow goes from step 74 to step 76 in which the called function of step 68 is executed, which in the present example activates ringer control $20_{RC}$ to energize ringer/vibrator 26. In contrast and returning to step 74, if any MP is outside of its respective range provided by the IPHL and IPLL values, then the flow is from step 74 to step 78 in which the DF signal is asserted (or maintained) in FIGS. 4 and 5. In this case, the called function of step 68 to energize ringer/vibrator 26 is not executed and the functional item is disabled. Thus, in this last instance, to the extent that an unauthorized circuit has been detected and was intended to be triggered by the called function, that attempt has been negated and thwarted.

In a further tamper-resistant embodiment, display 12 is inactivated when display 12 is sufficiently covered or exposed to a detected level of darkness so that illumination from display 12, including its backlight, may not be used for unauthorized purposes. Indeed, in this embodiment display 12 is prevented from lighting up even when handset 10 is permitted to ring, so long as display 12 is covered by an object to a detectable extent thereby exposing the display to darkness by covering it. This additional embodiment is shown in a functional block diagram in FIG. 9. A photodiode, photocell, or other photodetector meaning any suitable type of optical (includes other radiant energy herein) detector element ODE is included in display 12, and an ODE detection input signal is provided as an input to, and checked by, an optical sensor state machine OSSM associated with a protective disable circuit PDC. Recall from earlier hereinabove that circuit PDC is a circuit that is coupled to receive one or more disable function DF signals and issue appropriate control so as to prevent a corresponding function from being performed (e.g., preventing ringing/vibrating, disabling the display and/or its back light, CD, headphones, decoupling connector to battery charger or USB, etc.). More particularly, prior to activating display 12, the ODE input signal from optical detector element ODE is examined by circuit OSSM so as to determine whether element ODE detects a sufficient or total darkness. If such darkness is detected, then circuit PDC asserts a display Back Light Disable BLD signal so as to disable the back light of display 12, that is, display 12 is disabled from illuminating. In this manner, therefore, a nefarious use of such illumination is avoided. Further, the FIG. 9 embodiment also avoids unnecessary battery drain if the display back light is requested to be activated when the display is covered up. This embodiment also recognizes that the user-desired visibility is absent when the display is sufficiently covered up, as far as the authorized user is concerned. Accordingly, a display-lighting-up (and ring-response when also protected) is advantageously inactivated, disabled and prevented when the display is sufficiently covered. Inactivating display 12 while display 12 is detectably covered saves battery power and lengthens the hours of operating duration of handset 10.

Figure 9:
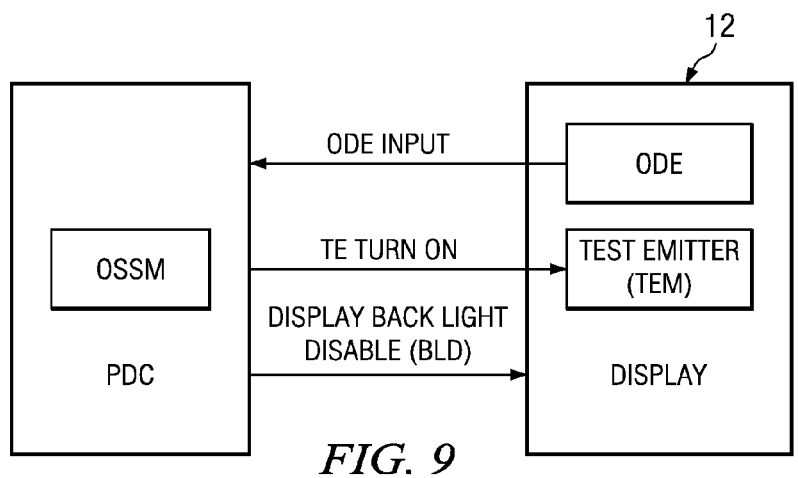
FIG. 9 illustrates an electrical functional block diagram of certain alternative and additional aspects of the handset of FIG. 1 in connection with a display control function.

Note that detectable partial or total darkness might naturally occur in a sufficiently dark environment (e.g., a room) where the display back light desirably should illuminate so that the authorized user may see and locate handset 10 in order to answer an incoming call or other activity of handset 10. Accordingly, a further embodiment additionally provides a low current, very-low-light-level light emitter herein called a test emitter TEM as also shown in FIG. 9. Test emitter TEM is either inserted as a light emitting element in display 12 or, alternatively, an existing one or more of the display elements (e.g., pixels) are dedicated or used part-time to serve as such a test emitter, under control by optical sensor state machine OSSM. Test emitter TEM is suitably a relatively small element of the display 12 that can be individually activated. If this type of element does not pre-exist in display 12, then a small LED or other low-level emitter is suitably added as test emitter TEM. Test emitter TEM provides an optical test signal that has low light level (e.g., less than one-tenth) relative to the illumination that the display is ordinarily operable to provide. The optical test signal is arranged to be detected by detection element ODE if, during instances of light emission from emitter TE, the test emitted light is reflected so as to be detectable by element ODE. Note that such a reflection is probable if an item covers display 12 and by its presence provides the reflection to be sensed by optical detection element ODE. The same positioning of element ODE and emitter TE should be such that element ODE does not detect a light emission from emitter TE when there is no reflection of that light, as is the case when display 12 is uncovered or otherwise openly exposed to the area around it whereby it is desirably visible to an ordinary user. In some embodiments, test emitter TEM is driven by a circuit so that test emitter TEM provides repetitive light pulses, and element ODE is in complementary fashion provided with a transmission gate, integrator and/or optical pulse repetition detector and/or other suitable detection circuit for detecting the optical pulses from test emitter TEM, analogous to the electrical detection of FIGS. 4 and 5.

Figure 10:
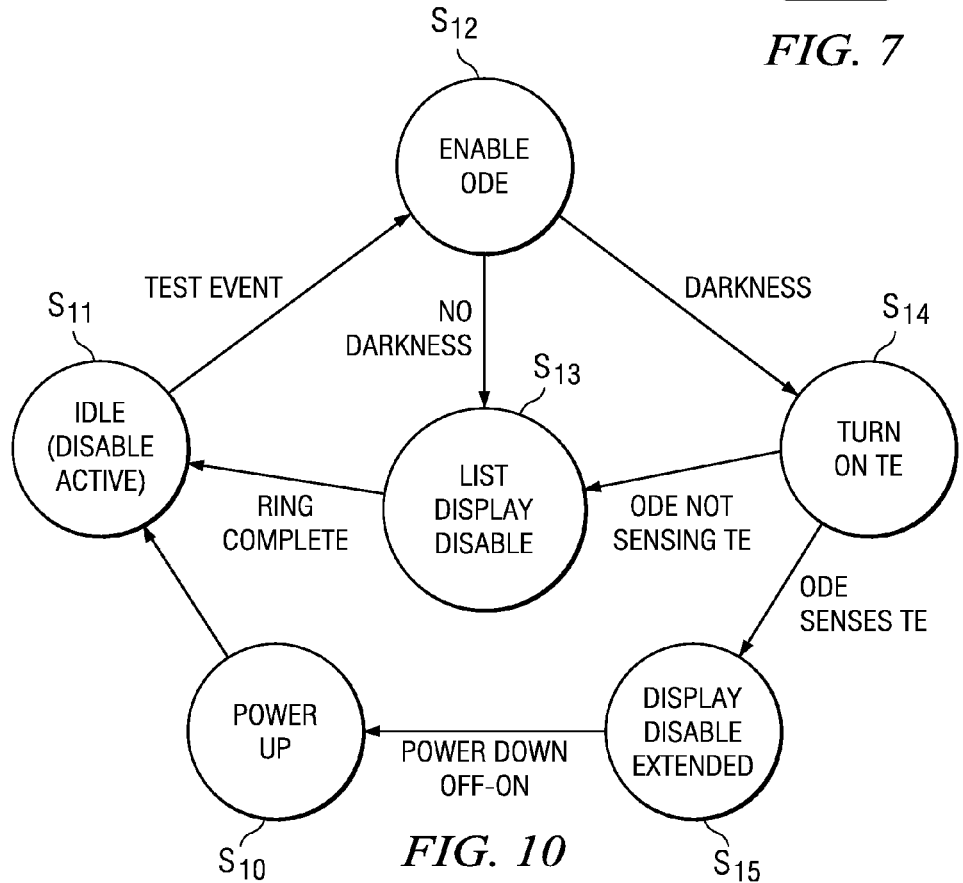
FIG. 10 illustrates a state transition diagram of a state machine and process for controlling various states of the blocks of FIG. 9.

FIG. 10 illustrates a state transition diagram for the optical sensor state machine OSSM that controls operations in FIG. 9. For sake of avoiding confusion with the earlier-described state machine VSSM of FIG. 6, the states in FIG. 10 are arbitrarily shown as states $S_{10}$ through $S_{15}$, and they are now described. The test of display 12 is activated at power up, for example, and also is made to run occasionally, periodically, and/or randomly during operation of handset 10 at times other than ring, alarm, and incoming e-mail/message/beeper request. In this way, activation of emitter TEM for the test, even if the test were externally sensed by an unauthorized circuit is not a reliable indication of an incoming call. Also, in some embodiments the back light itself is activated over time at periodic and/or random intervals or to support other features of handset 10 so that the back light activation varies in the meaning of its signification.

Looking then to FIG. 10, operations begin with a POWER UP state $S_{10}$ and state machine OSSM then proceeds to an IDLE state $S_{11}$ wherein the back light disable BLD signal is asserted or activated—this signal, as its name suggests, disables the backlight to display 12 and optionally in another embodiment may disable a portion or all of its picture elements or pixel elements as well. Next, when a test event occurs, a transition is made from state $S_{11}$ to a state $S12$ which enables detector element ODE and any related circuit (and continues assertion of the BLD signal). The test event may includes an instance of power up, re-boot from reset, an occasionally initiated test of either periodic or random nature, as well as the occurrence of an incoming call, e-mail, message, beeper request, imminent alarm clock time-out, or other event that otherwise during normal operations would cause an illumination of the back light of display 12. If detector element ODE detects some light (no or insufficient darkness), then operations transition from state S12 to a state S13, whereas if element ODE detects no or insufficient light (i.e., sufficiently detected darkness), then operations transition from state $S_{12}$ to a state $S_{14}$. Each of these alternatives destination states, $S_{13}$ and $S_{14}$, is separately discussed below.

State $S_{13}$ de-asserts the backlight disable BLD signal, thereby permitting the back light of display 12 to be activated normally if the display back light would otherwise be activated and provided the electrical verification sensor circuitry of FIGS. 4 and 5 does not prevent display activation. Also, the request, such as a ring or alarm request, that triggered the test event (to get to state $S_{12}$) is permitted to execute, provided the electrical verification sensor circuitry of FIGS. 4 and 5 does not prevent ring activation. Upon completion of ring, operations go from state $S_{13}$ back to the IDLE state $S_{11}$ whereupon the back light disable BLD signal is reasserted. In case state $S_{13}$ has been reached by some occasional test event wherein display 12 would not be illuminated normally at this time, then operations go directly from state $S_{13}$ back to IDLE state $S_{11}$ without interruption (lifting) of the back light disable BLD signal in state $S_{13}$.

Recall that state $S_{14}$ is reached when detector element ODE detects sufficient darkness. In this instance, state $S_{14}$ activates test emitter TEM, which (see FIG. 9) then emits a test light signal (e.g., a light pulse or pulses). If detector element ODE now senses light emitted by emitter TEM, operation transitions from state $S_{14}$ to state $S_{15}$. On the other hand, if detector element ODE fails to sense light emitted by test emitter TEM, then operations transition from state $S_{14}$ to state $S_{13}$. The latter state $S_{13}$ is described hereinabove. Thus, this transition from state $S_{14}$ to state $S_{13}$ recognizes an instance of acceptable darkness such as when the radiance of test emitter TEM is lost in pitch-darkness of a room and consequently element ODE fails to sense that radiance.

State S15 is reached from state S14 when detector element ODE senses light emitted by test element TE. State $S_{15}$ asserts a signal DISPLAY_DISABLE_EXTENDED, which thereby maintains the back light disable BLD signal until a power down occurs and re-starting of handset 10 occurs by turning the power back on. This transition recognizes a situation of unacceptable darkness and that turning on the back light of handset 10 is inadvisable or power-wasteful even if handset 10 would otherwise ordinarily turn on the back light on ring or alarm. If the handset belt holder and soft cover do not admit light, or if handset 10 is stored somewhere that admits no light, or handset 10 is positioned with its display 12 face down on a somewhat reflective table or other surface in a pitch-dark room, or buried underneath papers or clothes, then disablement of the back light is regarded as acceptable.

From the above, it is appreciated that various embodiments provide a portable electronic device with access to electrical signals and/or radiant energy from that device rendered more tamper resistant. Various embodiments have been described in connection with cellular telephone handsets, and other embodiments are suitably implemented in these and other portable electronic devices, including but not limited to: the PDA and related data organizers, portable music players, pagers, portable video game players, wireless email devices, and portable alarm clocks, where such items have events that are made to occur so as to change a signal state in the device and that change in signal state is potentially accessible to a nefarious user for triggering a circuit. Still further, while various alternatives have been provided according to the disclosed embodiments, still others are contemplated and yet others can ascertained by one skilled in the art. In various forms the embodiments provide various benefits. For example, some embodiments sense unauthorized circuitry and as the device incurs a function call or event that would ordinarily change the state of signals of the device (e.g., an alarm is to issue, a ringer to ring, a display is to turn on), the state change is delayed while a determination is made as to whether an unauthorized circuit has been added to the device, such as to any node(s) that would be affected by the state change. If the determination finds that no such unauthorized circuit has been added, as indicated by measurements within parameter ranges typical of a particular product that is mass-produced, then the state change is permitted to occur. On the other hand, if the determination finds that such an unauthorized circuit has been added, as indicated by an out-of-range condition or other detection, then the delayed state change is prevented from happening to thwart unauthorized use. The functions called or events to occur and that are contingent on the determination just described are myriad in numerous embodiments, and many have been explained above such as an incoming call or e-mail, which in some cell phones and other portable devices, can change the device state by activating the display and the ring/vibrator control circuit or other loads. Still other examples exist and will be appreciated by one skilled in the art. For example, an incoming video and/or audio stream or clip is analogous to an e-mail in certain handsets and other portable devices that thereupon activate the display, a player and other loads such as the ring/vibrator control circuit. As another example, video/audio player devices that play content recorded on a CD or disk drive, the video/audio can control battery current to the display, player/hard drive motor and/or other load (even assuming ringer/vibrator is not activated). Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. Tamper-resistant circuitry for inclusion in an electronic device, the tamper-resistant circuitry comprising:
   wireless receiving circuitry operable to receive an incoming communication;
   a first circuit operable to change a signal state in response to the incoming communication; and
   a verification sensor circuit coupled to the first circuit and operable to detect a circuit condition indicative of unauthorized use and upon detection of the circuit condition to prevent the change of the signal state; and
   wherein the verification sensor circuit comprises:
      circuitry for measuring a first parameter associated with at least one node of the first circuit; and
      circuitry for comparing the first parameter to a range of acceptable values, wherein the verification sensor is operable to detect the circuit condition indicative of unauthorized use in response to a determination from the comparing that the first parameter is outside the range of acceptable values.

2. Tamper-resistant circuitry for inclusion in an electronic device, the tamper-resistant circuitry comprising:
   wireless receiving circuitry operable to receive an incoming communication;
   a first circuit operable to change a signal state in response to the incoming communication; and
   a verification sensor circuit coupled to the first circuit and operable to detect a circuit condition indicative of unauthorized use and upon detection of the circuit condition to prevent the change of the signal state
   wherein the verification sensor circuit is operable to detect the circuit condition indicative of unauthorized use in response to loading a node in the first circuit with different impedances and measuring a respective resultant parameter associated with the node and for each of the different impedances.

3. The tamper-resistant circuitry of claim 2 wherein the resultant parameter comprises a change in voltage measured relative to the node.

4. The tamper-resistant circuitry of claim 2 wherein the resultant parameter comprises a time to accumulate a charge relative to the node.

5. The tamper-resistant circuitry of claim 2 wherein the resultant parameter is selected from a set consisting of a voltage, current, impedance, a change in voltage, a change in current, and a change in impedance.

6. Tamper-resistant circuitry for inclusion in an electronic device, the tamper-resistant circuitry comprising:
   wireless receiving circuitry operable to receive an incoming communication;

a first circuit operable to change a signal state in response to the incoming communication; and a verification sensor circuit coupled to the first circuit and operable to detect a circuit condition indicative of unauthorized use and upon detection of the circuit condition to prevent the change of the signal state wherein the verification sensor circuit is operable to detect the circuit condition indicative of unauthorized use in response to driving a node in the first circuit with different frequencies and measuring a respective resultant parameter associated with the node and for each of the different frequencies.

7. The tamper-resistant circuitry of claim 6 wherein the different frequencies comprise direct current zero frequency and at least one alternating current frequency.

8. The tamper-resistant circuitry of claim 6:
wherein the electronic device comprises a processor; and
wherein at least one of the different frequencies is generated by a clock oscillator for providing a clock signal to the processor.

9. The tamper-resistant circuitry of claim 1:
wherein the circuitry for measuring is for measuring a plurality of parameters associated with the at least one node of the first circuit, wherein the first parameter is one of the plurality of parameters; and
wherein the circuitry for comparing the parameter to a range of acceptable values is for comparing each parameter in the plurality of parameters to a respective range of acceptable values, wherein the verification sensor is operable to detect the circuit condition indicative of unauthorized use in response to a determination from the comparing that any parameter in the plurality of parameters is outside the respective range of acceptable values.

10. The tamper-resistant circuitry of claim 9 wherein each respective range of acceptable values corresponds to a different frequency applied to the at least one node.

11. The tamper-resistant circuitry of claim 10 wherein at least one different frequency comprises a direct current zero frequency and at least one different frequency comprises an alternating current frequency.

12. The tamper-resistant circuitry of claim 10:
wherein the electronic device comprises a processor; and
wherein at least one different frequency is generated by a clock oscillator for providing a clock signal to the processor.

13. The tamper-resistant circuitry of claim 1 wherein the circuitry for measuring is operable to load the at least one node at different frequencies.

14. The tamper-resistant circuitry of claim 1, and further comprising circuitry for storing a respective maximum level and a respective minimum level to define at least one such range of acceptable values.

15. The tamper-resistant circuitry of claim 14 and further comprising circuitry for providing a data indication of integrity verification for each respective range of acceptable values.

16. The tamper-resistant circuitry of claim 14 and further comprising circuitry for adjusting at least one of the respective maximum level and respective minimum level in response to a variable affecting the first parameter.

17. The tamper-resistant circuitry of claim 16:
wherein the electronic device is operable in response to a battery; and
wherein the variable affecting the first parameter comprises a level of charge in the battery.

18. The tamper-resistant circuitry of claim 17 wherein the circuitry for adjusting comprises circuitry operable to access a lookup table.

19. The tamper-resistant circuitry of claim 16 wherein the circuitry for adjusting comprises adjustment circuitry operable to apply a correction selected from a set consisting of linear, quadratic, cubic, higher-order, and multi-variate.

20. The tamper-resistant circuitry of claim 16 wherein the variable comprises temperature.

21. The tamper-resistant circuitry of claim 1 wherein the electronic device is selected from a set consisting of a cellular telephone, a personal digital assistant, a content player, a pager, a video game player, an email communication device, and an alarm clock.

22. The tamper-resistant circuitry of claim 1 further comprising a second circuit selected from the group consisting of a ringer, a vibrator, a display, a light, a motor, a driver, an amplifier, an LED, an interface, a DTMF input, a DTMF output, and a headphone/earphone; and wherein the change of the signal state is for causing operation of the second circuit.

23. The tamper-resistant circuitry of claim 1 wherein the change of the signal state comprises asserting a de-asserted signal.

24. The tamper-resistant circuitry of claim 1 wherein the change of the signal state comprises de-asserting an asserted signal.

25. The tamper-resistant circuitry of claim 24 wherein de-asserting an asserted signal comprises de-asserting a voltage signal.

26. The tamper-resistant circuitry of claim 1 wherein the incoming communication comprises data selected from a set consisting of voice data, video data, text data, and control data.

27. The tamper-resistant circuitry of claim 1 wherein the verification sensor circuit is operable to detect the circuit condition at different times.

28. The tamper-resistant circuitry of claim 27 wherein the different times are selected from a set consisting of start-up of the electronic device, reset of the electronic device, randomized times, fixed-period times, and in response to a requested operation of a circuit that requires the change of the signal state.

29. The tamper-resistant circuitry of claim 1 wherein the verification sensor circuit comprises a processor.

30. The tamper-resistant circuitry of claim 1 and wherein:
the first circuit includes a plurality of circuits each circuit in the plurality of circuits operable to change a respective signal state in response to the incoming communication; and
the verification sensor circuit includes a plurality of verification sensors coupled to the first circuit, wherein each verification sensor in the plurality of verification sensors is operable to detect a circuit condition indicative of unauthorized use.

31. A portable electronic device, comprising:
wireless receiving circuitry operable to receive an incoming communication;
a first circuit operable to change a signal state in response to the incoming communication; and
a verification sensor circuit coupled to the first circuit and operable to detect a circuit condition indicative of unauthorized use and upon detection of the circuit condition to prevent the change of the signal state; and
wherein the verification sensor circuit comprises:
circuitry for measuring a first parameter associated with at least one node of the first circuit; and circuitry for comparing the first parameter to a range of acceptable values, wherein the verification sensor is operable to detect the circuit condition indicative of unauthorized use in response to a determination from the comparing that the first parameter is outside the range of acceptable values.

32. The portable electronic device of claim 31 wherein the first circuit is operable to provide functionality selected from a set consisting of a cellular telephone functionality, personal digital assistant functionality, music player functionality, pager functionality, video game player functionality, email communication, and alarm functionality.

33. A method of reducing an opportunity for tampering of circuitry in an electronic device, comprising:
receiving an incoming wireless communication for provoking a change of a signal state by a circuit in response to the incoming wireless communication; and
detecting a circuit condition indicative of unauthorized use and upon detection of the circuit condition preventing the change of the signal state by the circuit; and
wherein the detecting comprises:
measuring a parameter associated with at least one node of the circuit; and
comparing the parameter to a range of acceptable values, wherein the detecting detects the circuit condition indicative of unauthorized use when the parameter is outside the range of acceptable values.

34. The method of claim 33:
wherein the measuring is for measuring a plurality of parameters associated with the at least one node of the circuit; and
wherein the comparing is for comparing each parameter in the plurality of parameters to a respective range of acceptable values, wherein the detecting detects the circuit condition indicative of unauthorized use when any parameter in the plurality of parameters is outside its respective range of acceptable values.

35. The method of claim 33 further comprising adjusting at least one value affecting the range of acceptable values in response to a variable affecting the parameter.

36. The method of claim 33 wherein the change of signal state is for causing operation of a circuit selected from the group consisting of a ringer, a vibrator, a display, a light, a motor, a driver, an amplifier, an LED, an interface, a DTMF input, a DTMF output, and a headphone/earphone.

37. The method of claim 33 wherein the incoming communication comprises data selected from a set consisting of voice data, video data, text data, and control data.

38. A method of reducing an opportunity for tampering of circuitry in an electronic device, comprising:
receiving an incoming wireless communication for provoking a change of a signal state by a circuit in response to the incoming wireless communication; and
detecting a circuit condition indicative of unauthorized use and upon detection of the circuit condition preventing the change of the signal state by the circuit; and
wherein the detecting comprises loading a node in the circuit with different impedances and measuring a respective resultant parameter associated with the node for each of the different impedances.

39. A method of reducing an opportunity for tampering of circuitry in an electronic device, comprising:
receiving an incoming wireless communication for provoking a change of a signal state by a circuit in response to the incoming wireless communication;
detecting a circuit condition indicative of unauthorized use and upon detection of the circuit condition preventing the change of the signal state by the circuit; and
wherein the detecting comprises driving a node in the circuit with different frequencies and measuring a respective resultant parameter associated with the node for each of the different frequencies.

40. A method of reducing an opportunity for tampering of circuitry in an electronic device, comprising:
receiving an incoming wireless communication for provoking a change of a signal state by a circuit in response to the incoming wireless communication; and
detecting a circuit condition indicative of unauthorized use and upon detection of the circuit condition preventing the change of the signal state by the circuit; and
wherein the detecting is responsive to evaluating a measured parameter that is selected from a set consisting of a voltage, current, impedance, a change in voltage, a change in current, and a change in impedance.

41. A portable electronic device, comprising:
wireless receiving circuitry operable to receive an incoming communication;
a first circuit operable to change a signal state in response to the incoming communication; and
a verification sensor circuit coupled to the first circuit and operable to detect a circuit condition indicative of unauthorized use and upon detection of the circuit condition to prevent the change of the signal state;
wherein the verification sensor circuit is operable to detect the circuit condition indicative of unauthorized use in response to loading a node in the first circuit with different impedances and measuring a respective resultant parameter associated with the node and for each of the different impedances.

42. A portable electronic device, comprising:
wireless receiving circuitry operable to receive an incoming communication;
a first circuit operable to change a signal state in response to the incoming communication; and
a verification sensor circuit coupled to the first circuit and operable to detect a circuit condition indicative of unauthorized use and upon detection of the circuit condition to prevent the change of the signal state;
wherein the verification sensor circuit is operable to detect the circuit condition indicative of unauthorized use in response to driving a node in the first circuit with different frequencies and measuring a respective resultant parameter associated with the node and for each of the different frequencies.

* * * * *